US012790869B2

(12) United States Patent
Fritschle et al.

(10) Patent No.: US 12,790,869 B2
(45) Date of Patent: Nov. 10, 2026

(54) POWERED VEHICLE CLOSURE SYSTEM HAVING NON-LINEAR TORSION BAR

(71) Applicant: STRATTEC POWER ACCESS LLC, Auburn Hills, MI (US)

(72) Inventors: Jacob Fritschle, Rochester Hills, MI (US); William Champ, Mt. Clemens, MI (US); Howard W. Kuhlman, Clarkston, MI (US); Greg Sproule, Linden, MI (US)

(73) Assignee: STRATTEC POWER ACCESS LLC, Auburn Hills, MI (US)

( * ) Notice: Subject to any disclaimer, the term of this patent is extended or adjusted under 35 U.S.C. 154(b) by 826 days.

(21) Appl. No.: 18/195,611

(22) Filed: May 10, 2023

(65) Prior Publication Data

US 2023/0407692 A1 Dec. 21, 2023

Related U.S. Application Data

(60) Provisional application No. 63/370,038, filed on Aug. 1, 2022, provisional application No. 63/352,404, filed on Jun. 15, 2022.

(51) Int. Cl.

| | |
|---|---|
| ***E05F 1/00*** | (2006.01) |
| ***E05F 1/12*** | (2006.01) |
| ***E05F 15/611*** | (2015.01) |

(52) U.S. Cl.
CPC .......... *E05F 1/1238* (2013.01); *E05F 15/611* (2015.01); *E05Y 2201/638* (2013.01); *E05Y 2900/544* (2013.01)

(58) Field of Classification Search
CPC E05F 1/1238; E05F 15/611; E05Y 2201/638; E05Y 2900/544
USPC ........................................................... 296/50
See application file for complete search history.

(56) References Cited

U.S. PATENT DOCUMENTS

| | | | | |
|---|---|---|---|---|
| 9,234,378 B2 | 1/2016 | Hansen | | |
| 9,540,859 B2 | 1/2017 | Hansen | | |
| 11,345,418 B2 * | 5/2022 | Lakerdas | ............. | B62D 33/037 |
| 2018/0251164 A1 * | 9/2018 | Jergess | ................. | B62D 33/037 |
| 2022/0056750 A1 * | 2/2022 | Reif | ...................... | E05F 15/627 |
| 2023/0339550 A1 * | 10/2023 | Reif | ....................... | B62D 33/03 |

* cited by examiner

*Primary Examiner* — Steven O Douglas
(74) *Attorney, Agent, or Firm* — Michael Best & Friedrich LLP

(57) ABSTRACT

A powered vehicle closure system includes a vehicle frame, a vehicle closure pivotally coupled to the vehicle frame, a torsion bar fixed to both the vehicle frame and the vehicle closure, and a torque device coupled to the torsion bar, wherein the torque device is configured to generate a non-linear torsion bar torque output as the vehicle closure pivots relative to the vehicle frame.

18 Claims, 21 Drawing Sheets

POWERED VEHICLE CLOSURE SYSTEM HAVING NON-LINEAR TORSION BAR

CROSS-REFERENCE TO RELATED APPLICATIONS

This application claims priority to U.S. Provisional Application No. 63/370,038, filed Aug. 1, 2022, and to U.S. Provisional Application No. 63/352,404, filed Jun. 15, 2022, the entire contents of each of which are incorporated herein by reference.

FIELD

This disclosure relates generally to powered vehicle closure systems, and particularly to powered vehicle closure system that use torsion bars to assist with closing a vehicle closure in an automotive application including, but not limited to, truck end gates or tailgates.

SUMMARY

In one aspect, the disclosure provides a vehicle closure system having a vehicle frame, a vehicle closure pivotally coupled to the vehicle frame, a torsion bar fixed to both the vehicle frame and the vehicle closure, and a torque device coupled to the torsion bar, wherein the torque device is configured to generate a non-linear torsion bar torque output as the vehicle closure pivots relative to the vehicle frame.

In another aspect, the disclosure provides a torque device for generating a non-linear torsion bar torque output in a vehicle closure system. The torque device includes an eccentric driving gear, and an eccentric moving gear configured to be fixed to the torsion bar and configured to be driven by the eccentric driving gear.

In another aspect, the disclosure provides a torque device for generating a non-linear torsion bar torque output in a vehicle closure system. The torque device includes a first, base bracket configured to be fixed to a vehicle frame, a second bracket configured to be fixed to a vehicle closure, and a shaft configured to extend through both the first bracket and the second bracket. The shaft includes a first, non-cylindrical head configured to be rotationally coupled to a first end of the torsion bar. The torque device also includes a bushing configured to extend through the second bracket, and a sleeve configured to extend through each of the bushing, the first bracket, and the second bracket. The shaft is configured to be concentric to the sleeve, but is configured to rotate in an opposite direction from the sleeve.

Other aspects of the disclosure will become apparent by consideration of the detailed description and accompanying drawings.

BRIEF DESCRIPTION OF THE DRAWINGS

FIGS. 20-21*f* are side, front, and perspective views of the torque device of FIGS. 17-19*c*, when the vehicle closure is closed, the torque device is rotated 0 degrees, and the torsion bar is rotated 0 degrees.

DETAILED DESCRIPTION

Before any embodiments of the present disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
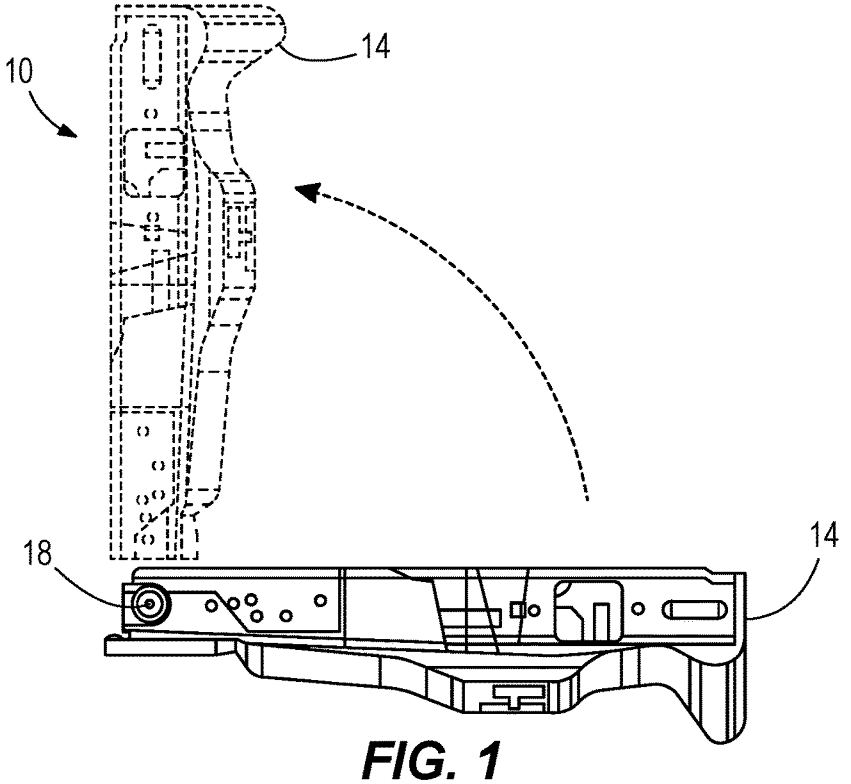
FIG. 1 is a side view of a vehicle closure system that includes a vehicle closure movable between an opened position and a closed position.

FIGS. 1-10 illustrates a vehicle closure system 10. As illustrated in FIG. 1, the vehicle closure system 10 includes a vehicle closure 14 (e.g., tailgate or any other structure on a vehicle that is pivoted between two or more positions). In the illustrated embodiment, the vehicle closure 14 pivots about a pivot axis 18 between an opened position and a closed position. In the opened position, the vehicle closure 14 is oriented generally horizontally. In the closed position, the vehicle closure 14 has rotated about the pivot axis 18 approximately degrees upwardly to a generally vertical position.

Figure 2:
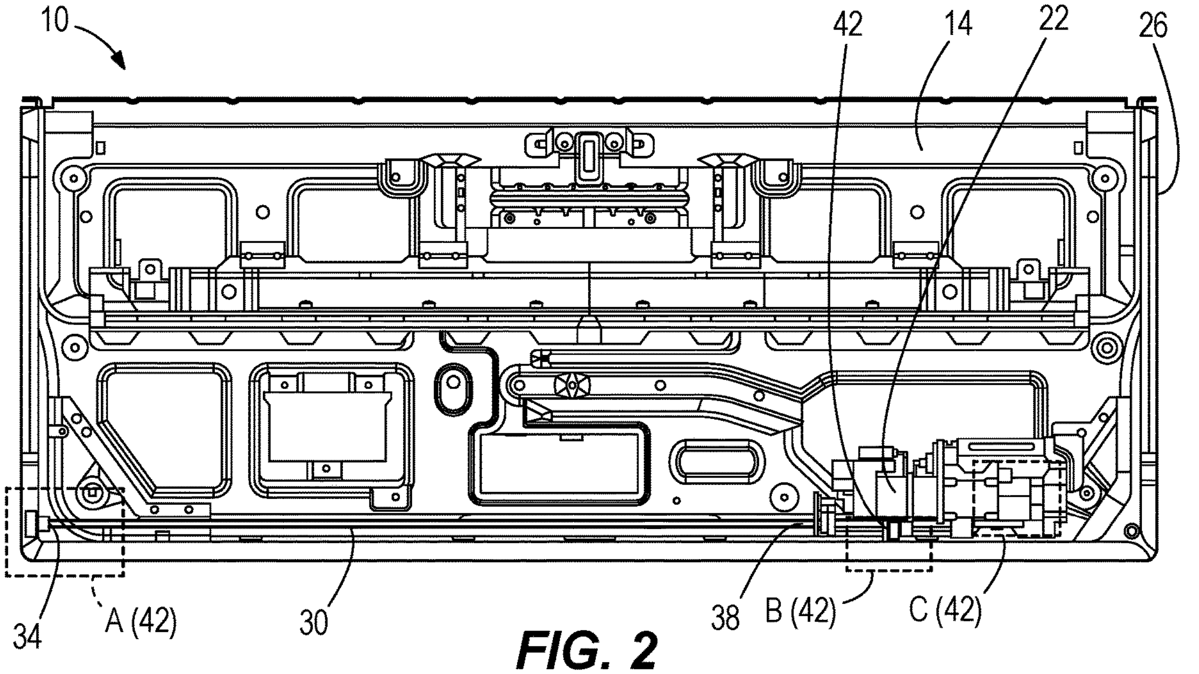
FIG. 2 is a front view of the vehicle closure, illustrating a torsion bar coupled to both the vehicle closure and to a vehicle frame, and illustrating different locations for a torque device to be coupled to the torsion bar to generate non-linear torsion bar torque output.

With reference to FIG. 2, in the illustrated embodiment the vehicle closure system also includes a power actuator 22 (e.g., electric motor) coupled to the vehicle closure 14 to move the vehicle closure 14 from the opened position to the closed position, from the closed position to the opened position, or both. In the illustrated embodiment, the power actuator 22 is positioned along a lower, righthand corner of the vehicle closure 14 (as viewed in FIG. 2), although other embodiments may include different locations for the power actuator 22. The power actuator 22 is coupled to both the vehicle closure 14, and also to a vehicle frame 26, such that when the power actuator 22 is activated, the power actuator 22 drives rotation of the vehicle closure 14 about the pivot axis 18, relative to the vehicle frame 26. In some embodiments, the power actuator 22 may not be provided, and the vehicle closure 14 may instead only be rotated manually between the opened and closed positions.

With continued reference to FIG. 2, the vehicle closure system 10 includes a torsion bar 30 coupled to the vehicle closure 14 (e.g., to assist with or otherwise affect forces required to open and/or close the vehicle closure 14). In the illustrated embodiment, the torsion bar 30 includes a first end 34 that is fixed relative to the vehicle frame 26 and a second, opposite end 38 that is fixed relative to the vehicle closure 14. The torsion bar 30 may be positioned generally at a lower end of the vehicle closure 14 and may extend, for example, substantially (e.g., at least halfway) across the vehicle closure 14. In some embodiments, the first end 34 of the torsion bar 30 is coupled directly to the vehicle frame 26, and the second end 38 of the torsion bar 30 is coupled directly to the vehicle closure 14. In other embodiments, the first end 34 of the torsion bar 30 is indirectly coupled to the vehicle frame 26, and/or the second end 38 of the torsion bar 30 is indirectly coupled to the vehicle closure 14. With continued reference to FIG. 2, in the illustrated embodiment, the second end 38 of the torsion bar 30 is coupled to the power actuator 22, and the power actuator 22 is coupled to the vehicle closure 14.

During use, the torsion bar 30 may act as a counterbalance for the weight of the vehicle closure 14 as the vehicle closure 14 pivots, and/or may assist with producing forces for selectively closing the vehicle closure 14. The rotational motion of the vehicle closure 14 with respect to the vehicle frame 26 may be transmitted to the torsion bar 30 which, through torsion, will create a torque acting about the pivot axis 18 opposite the moment created about the pivot axis 18 by the weight of the vehicle closure 14. As such, the two forces may at least partially cancel each other out.

With reference to FIGS. 2-10, the vehicle closure system 10 also includes a torque device 42 coupled to the torsion bar 30 to generate a non-linear torsion bar torque output as the vehicle closure 14 pivots relative to the vehicle frame 26. As illustrated in FIG. 2, the torque device 42 may be located at various positions A, B, C (or other locations) relative to the torsion bar 30. For example, the torque device 42 may be located at a position A that is close to or at the first end 34 of the torsion bar 30. Alternatively, the torque device 42 may be located at a position B, located close to or at the second end 38 of the torsion bar 30. Alternatively, the torque device 42 may be located at a position C within the power actuator 22.

Figure 3:
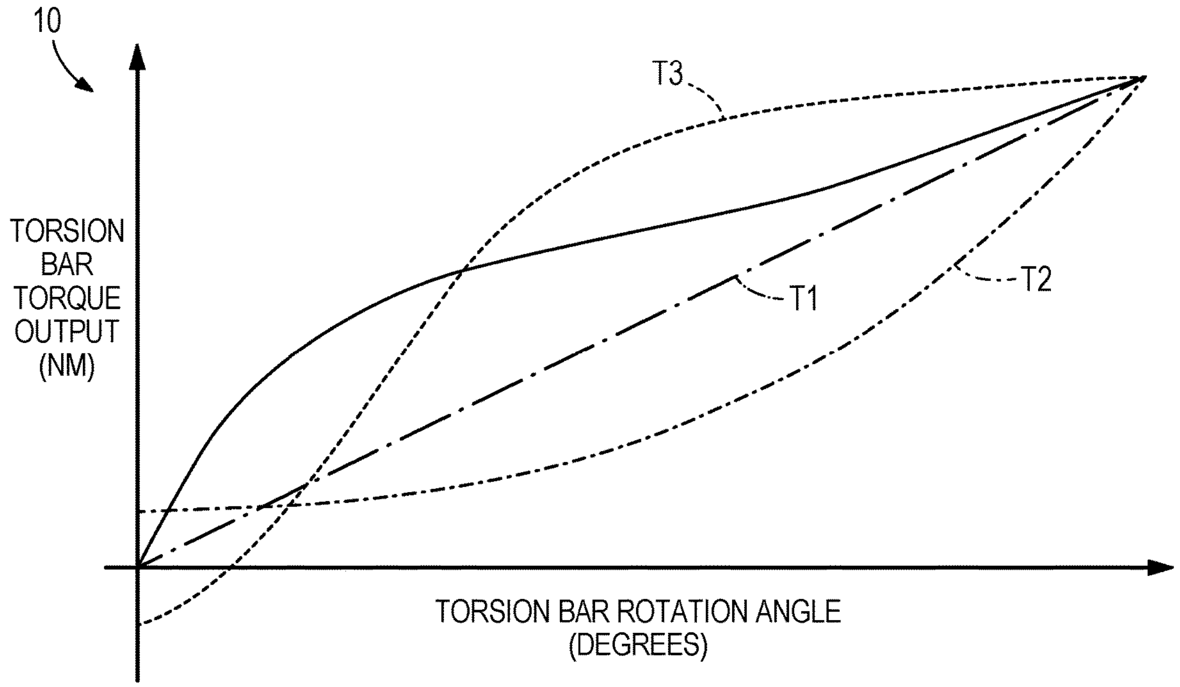
FIG. 3 is a graphical representation of various types of non-linear torsion bar torque outputs that may be generated by the torque device.

With reference to FIG. 3, without the torque device 42, the torsion bar 30 will produce a linear torque output (represented by line T1) as the vehicle closure 14 is rotated. Thus, as the vehicle closure 14 is rotated, the torsion bar 30 will twist (creating a torsion bar angle), and will produce a reactive torque output that varies linearly with respect to the rotation of the vehicle closure 14. However, by incorporating the use of the torque device 42, the torque output may be changed to a non-linear torque output. For example, as illustrated by line T2 in FIG. 3, the torque output may be such that when the torsion bar angle is zero (e.g., when the vehicle closure 14 is fully raised and in the closed position), there is a non-zero (e.g., positive) torque output. Alternatively, and as illustrated by line T3 in FIG. 3, the torque output may be such that when the torsion bar angle is zero (e.g., when the vehicle closure 14 is fully raised and in the closed position), there is a different non-zero (e.g., negative) torque output. As the torsion bar 30 is then rotated, the torque output may increase, following a non-linear curve. Other embodiments may include various other torque output curves other than those illustrated in FIG. 3.

Figure 4:
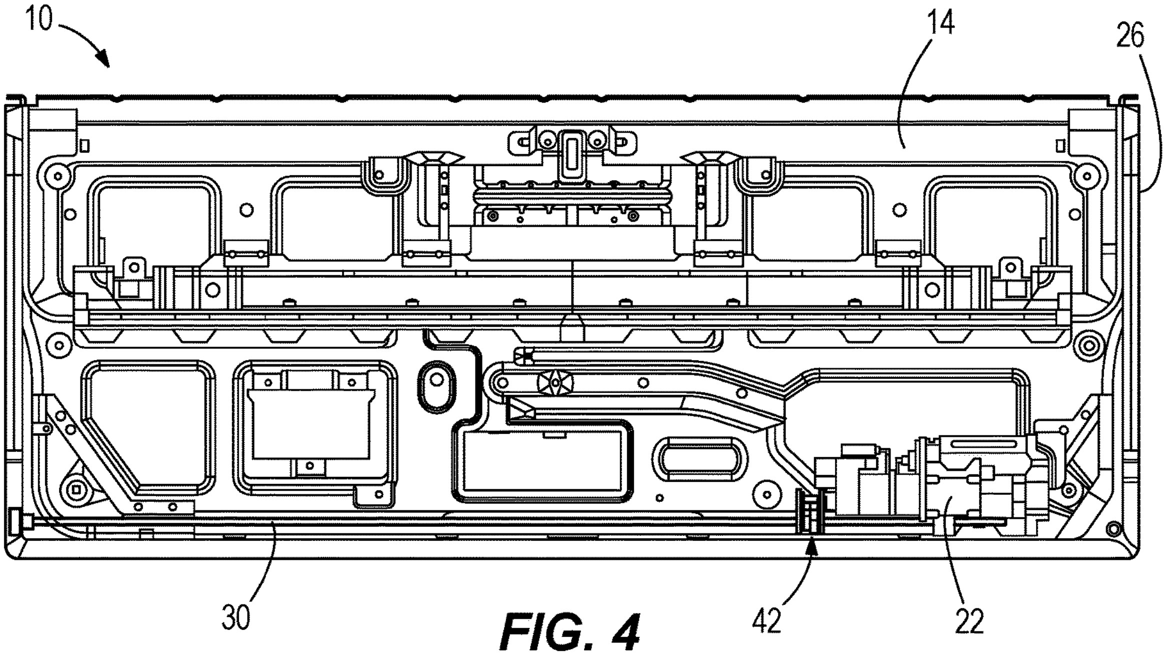
FIG. 4 is a front view of the vehicle closure system, illustrating a first type of torque device to generate the non-linear torsion bar torque output.
Figure 5:
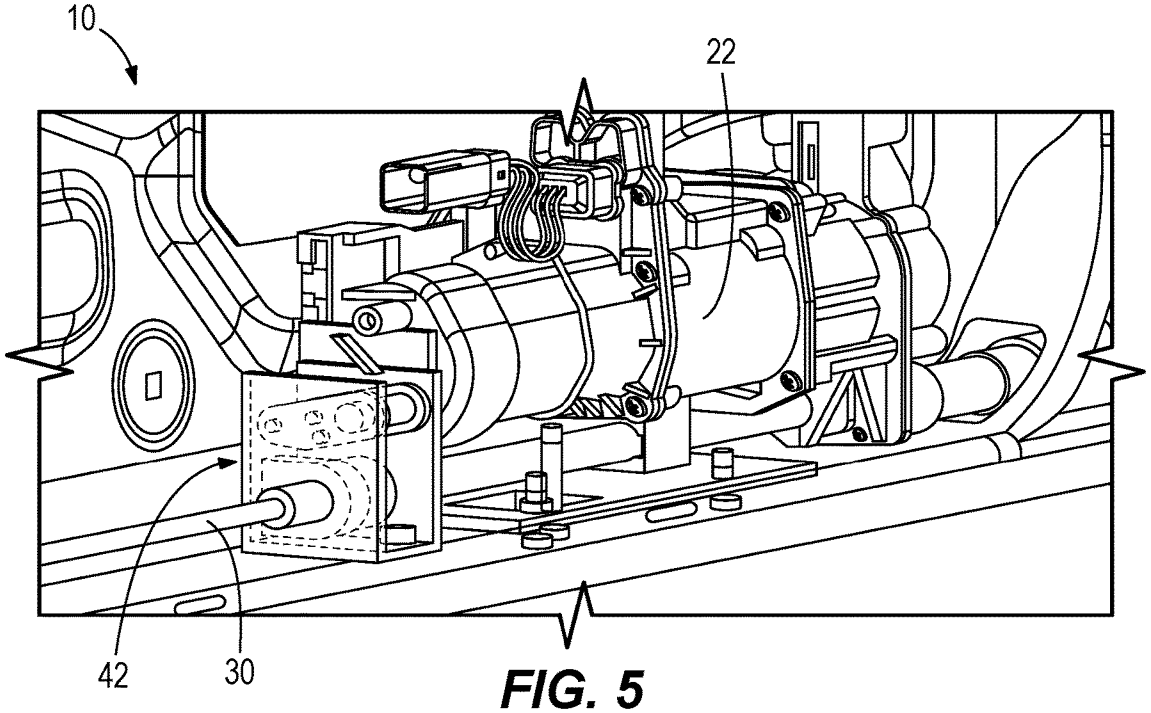
FIGS. 5 and 6 are perspective views of the torque device of FIG. 4, illustrating its position relative to a power actuator.
Figure 6:
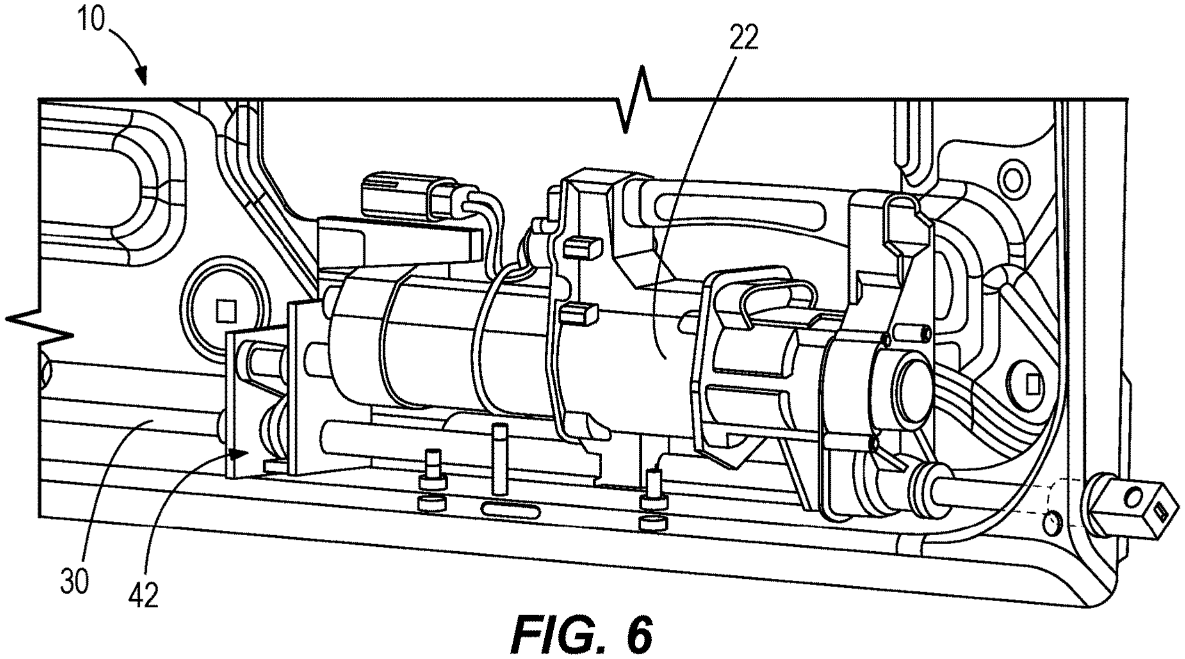
Figure 7:
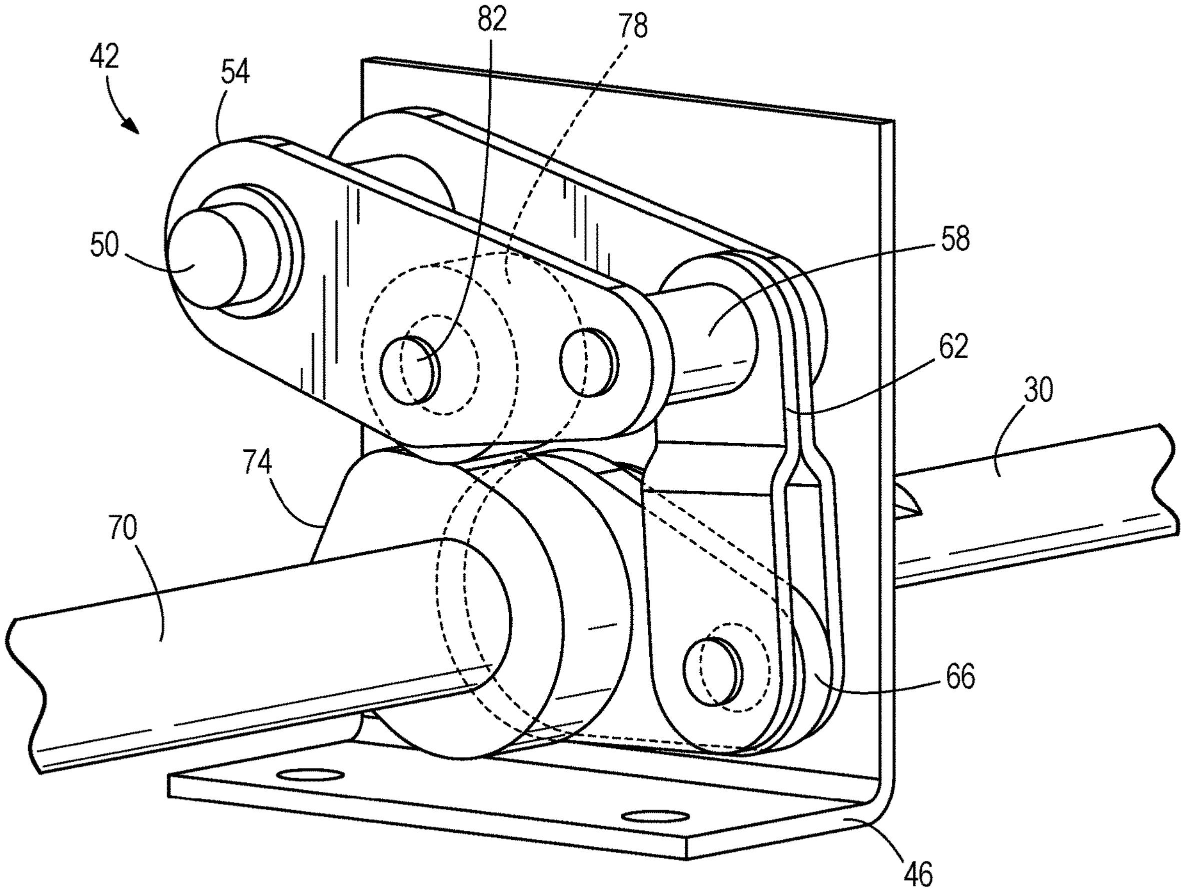
FIG. 7 is a perspective view of a portion of the torque device of FIG. 4.
Figure 8A:
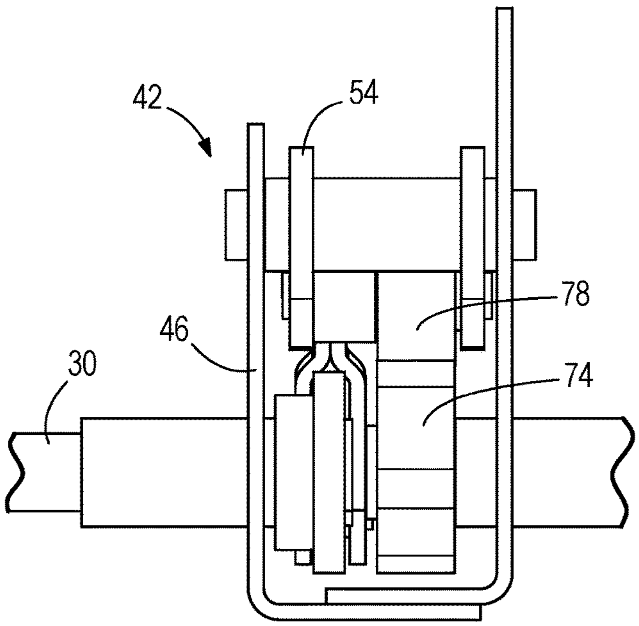
FIGS. 8*a*-8*c* are perspective and side views of the torque device of FIG. 4, when the vehicle closure is closed, the torque device is rotated 0 degrees, and the torsion bar is rotated 0 degrees.
Figure 8B:
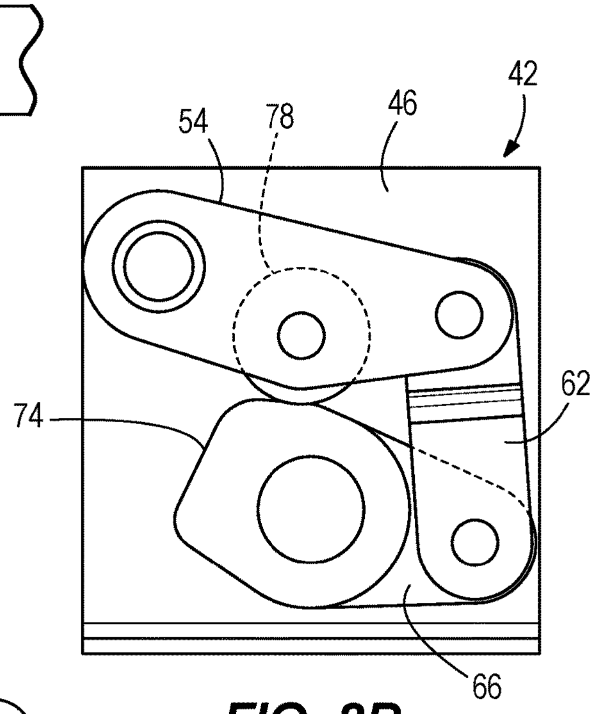
Figure 8C:
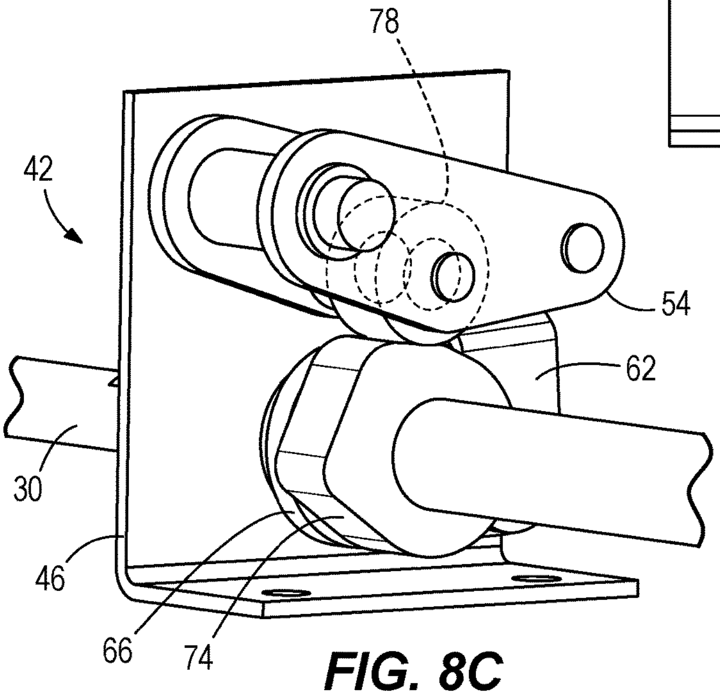

The torque device 42 itself may take any of a number of different forms (e.g., using gears, cams, etc.) to vary the torque output of the torsion bar 30. For example, and with reference to FIG. 7, in some embodiments the torque device 42 includes a base bracket 46 coupled (e.g., fixed) to the vehicle closure 14, such that the base bracket 46 moves with the vehicle closure 14. The torque device 42 also includes a first rivet 50 coupled (e.g. fixed) to the base bracket 46, and a first (e.g., driving) lever 54 pivotally coupled to the first rivet 50 (e.g., at a first end of the first lever 54). The torque device 42 also includes a second rivet 58 coupled (e.g., fixed) to the first lever 54 (e.g., at a second end of the first lever 54). The torque device 42 also includes a link member 62 pivotally coupled to the second rivet 58 (e.g., at a first end of the link member 62), and a second lever 66 that is pivotally coupled to the link member 62 (e.g., at a second end of the link member 62). The second lever 66 is coupled (e.g., fixed) to the torsion bar 30, such that rotation of the second lever 66 causes a twisting of the torsion bar 30. The torque device 42 also includes a shaft 70 that is coupled (e.g., fixed) to the vehicle frame 26. In the illustrated embodiment the shaft 70 is coaxial with the torsion bar 30, but moves independently from the torsion bar 30. As illustrated in FIG. 4, a cam member 74 is coupled (e.g., fixed) to an end of the shaft 70. The torque device 42 also includes a roller 78 coupled to the first lever 54. The roller 78 rotates about an axle 82, and is sized, shaped, and positioned such that it contacts and rolls along an outer surface of the cam member 74, forcing the first lever 54 to move non-linearly as the base bracket 46 rotates with the vehicle closure 14.

With reference to FIGS. **8*a*-8*c*, during use the vehicle closure 14 may initially be in the closed position. In this position, the torque device 42 is rotated 0 degrees, and the torsion bar 30** is rotated 0 degrees.

Figure 9A:
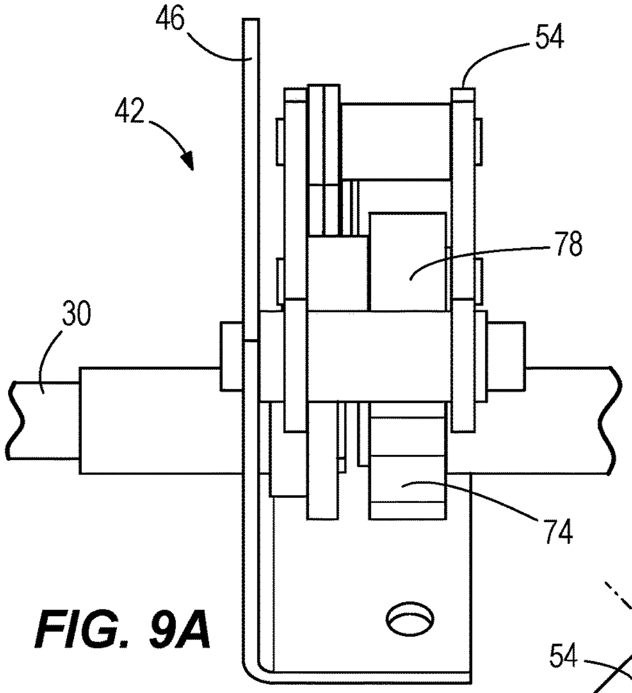
FIGS. 9*a*-9*c* are perspective and side views of the torque device of FIG. 4, when the vehicle closure is opened 45 degrees, the torque device is rotated 45 degrees, and the torsion bar is rotated 60 degrees.
Figure 9B:
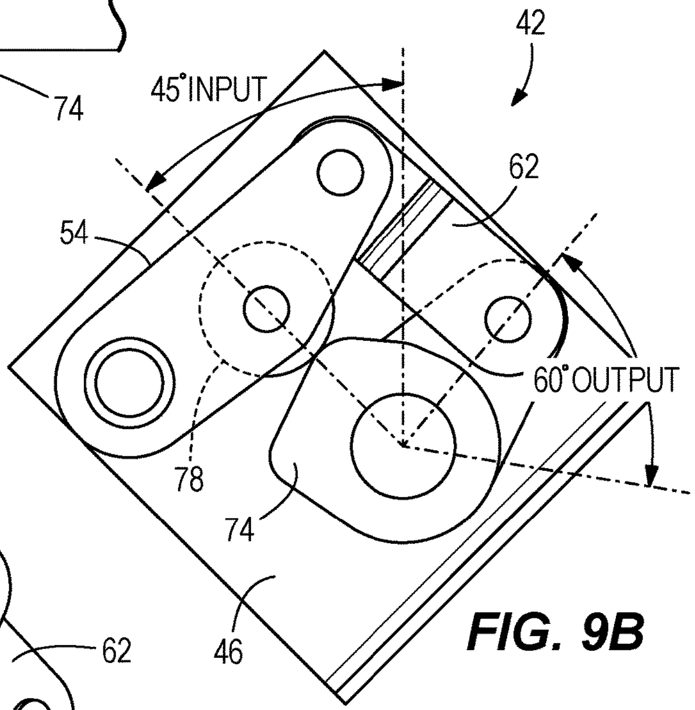
Figure 9C:
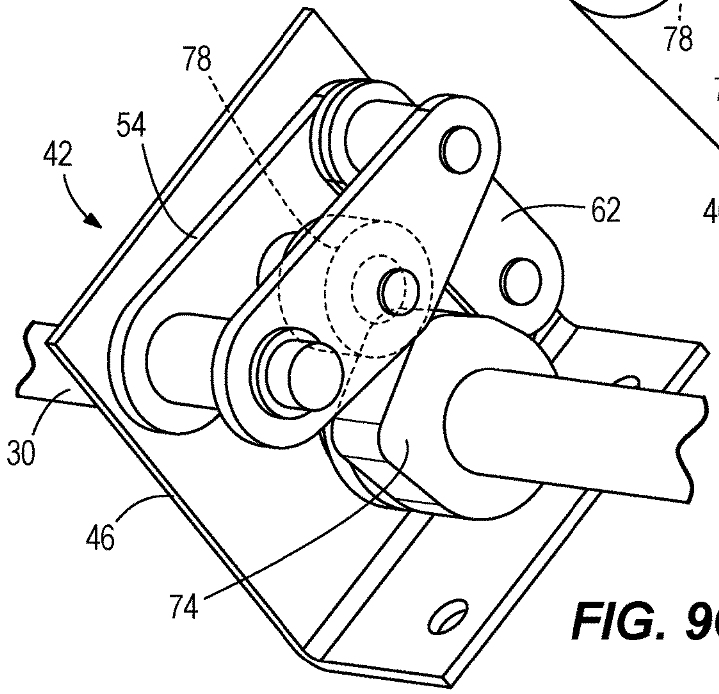

With reference to FIGS. **9*a*-9*c*, the vehicle closure 14 may be rotated 45 degrees about the pivot axis 18 (e.g., either manually or with the assistance of the power actuator 22), such that the torque device 42 also rotates 45 degrees. As illustrated in FIGS. 9*a*-9*c*, however, in this position the torsion bar 30 has rotated 60 degrees (as opposed to 45 degrees). This is due to the engagement of the roller 78 along the cam member 74, which causes the first lever 54 to rotate, lifting the link member 62 and rotating the second lever 66, thereby twisting and torquing the torsion bar 30**.

Figure 10A:
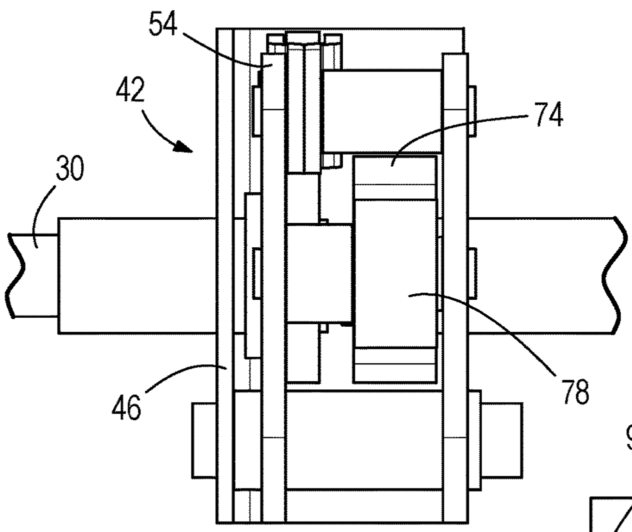
FIGS. 10*a*-10*c* are perspective and side views of the torque device of FIG. 4, when the vehicle closure is opened 90 degrees, the torque device is rotated 90 degrees, and the torsion bar is rotated 110 degrees.
Figure 10B:
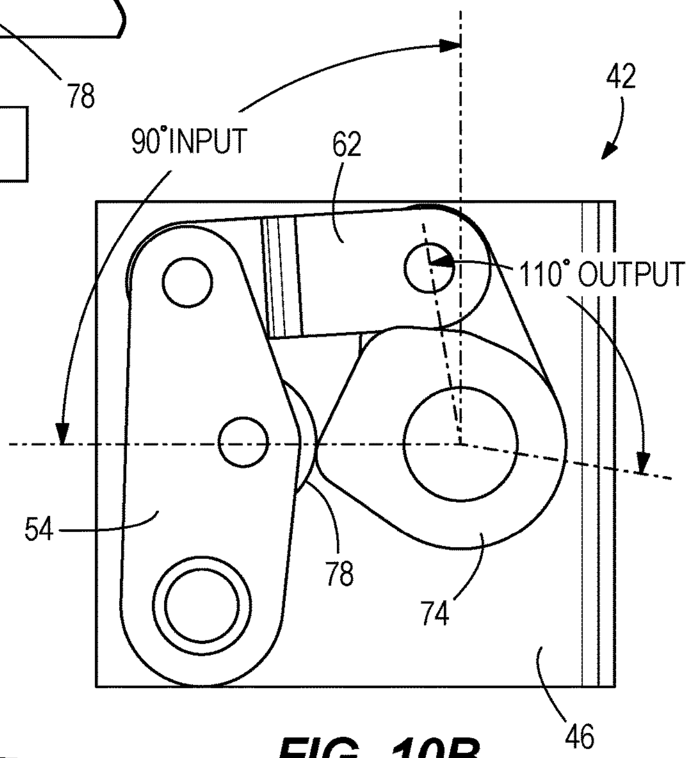
Figure 10C:
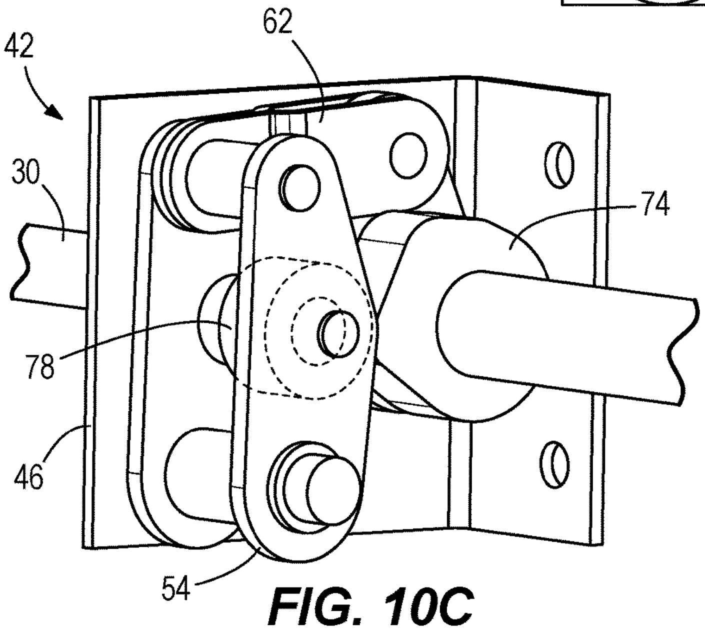

With reference to FIGS. **10*a*-10*c*, the vehicle closure 14 may be rotated farther another 45 degrees, such that the vehicle closure 14 is in the opened position. As illustrated in FIGS. 10***a*-10*c*, in this position the vehicle closure 14 has rotated 90 degrees, and the torque device 42 has also rotated 90 degrees. However, in this position the torsion bar 30 has rotated 110 degrees. Again, this is due to the engagement of the roller 78 along the cam member 74, and the movement of the first lever 54, the link member 62, and the second lever 66.

Figure 11:
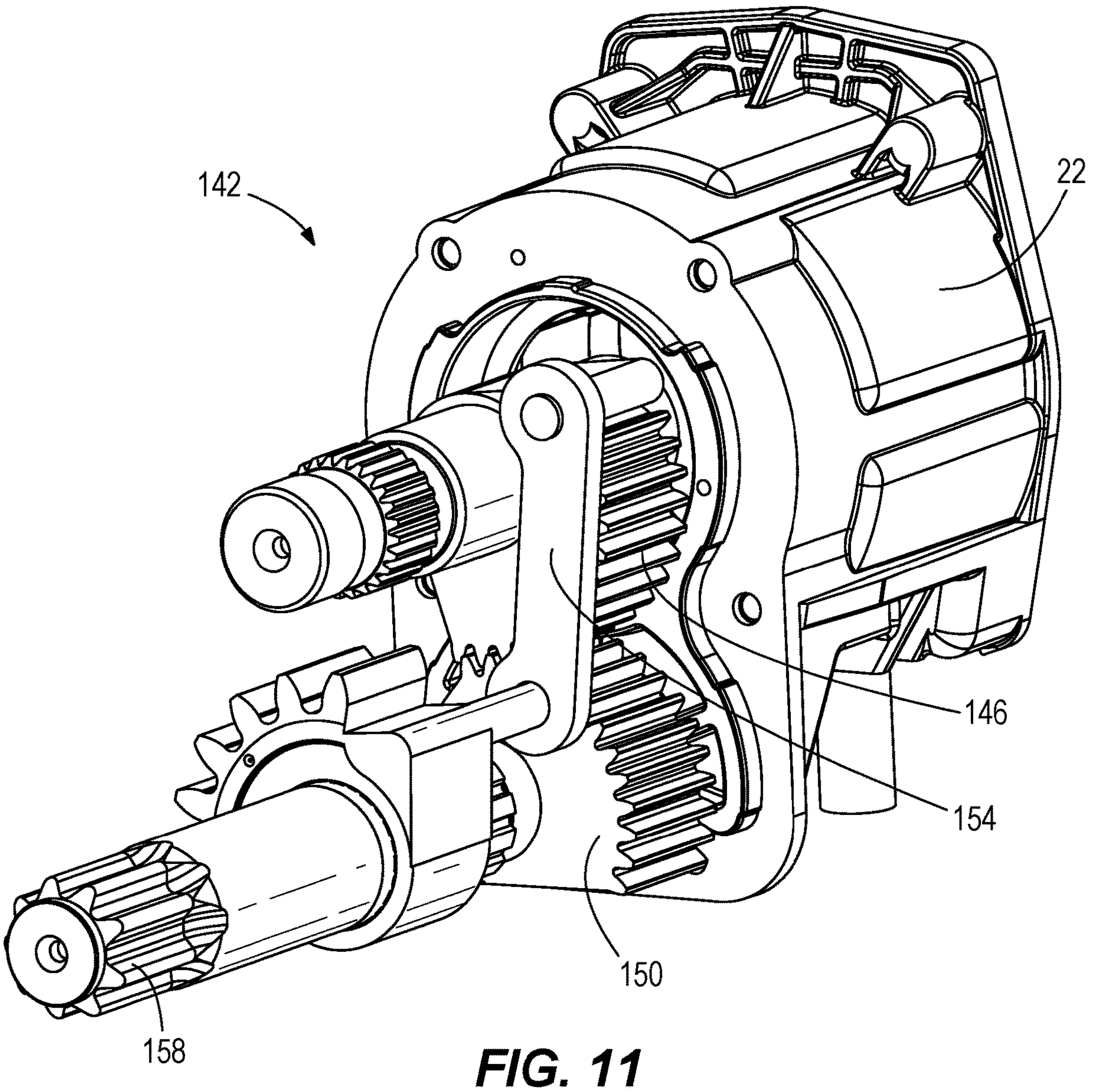
FIG. 11 is a perspective view of a torque device according to another embodiment, for use within the power actuator.

With reference to FIG. 11, in some embodiments the torque device (referenced as 142 in FIG. 11) is disposed within the power actuator 22 and includes an eccentric driving gear 146 (e.g., rotationally coupled to the power actuator 22), and an eccentric moving gear 150 that is driven by the eccentric driving gear 146. The eccentric moving gear 150 is coupled (e.g., fixed) to the torsion bar 30. The torque device 142 also includes a link member 154 that is coupled at one end to the eccentric driving gear 146, and at another end to a shaft 158 (e.g., to a gear at an end of the shaft 158). The shaft 158 is coupled (e.g., fixed) to the vehicle frame 26. Rotation of the vehicle closure 14 relative to the vehicle frame 26 causes the link member 154 to rotate the eccentric driving gear 146, which causes the eccentric driving gear 146 to drive rotation of the eccentric moving gear 150 and twist the torsion bar generating a non-linear torque output.

Figure 12:
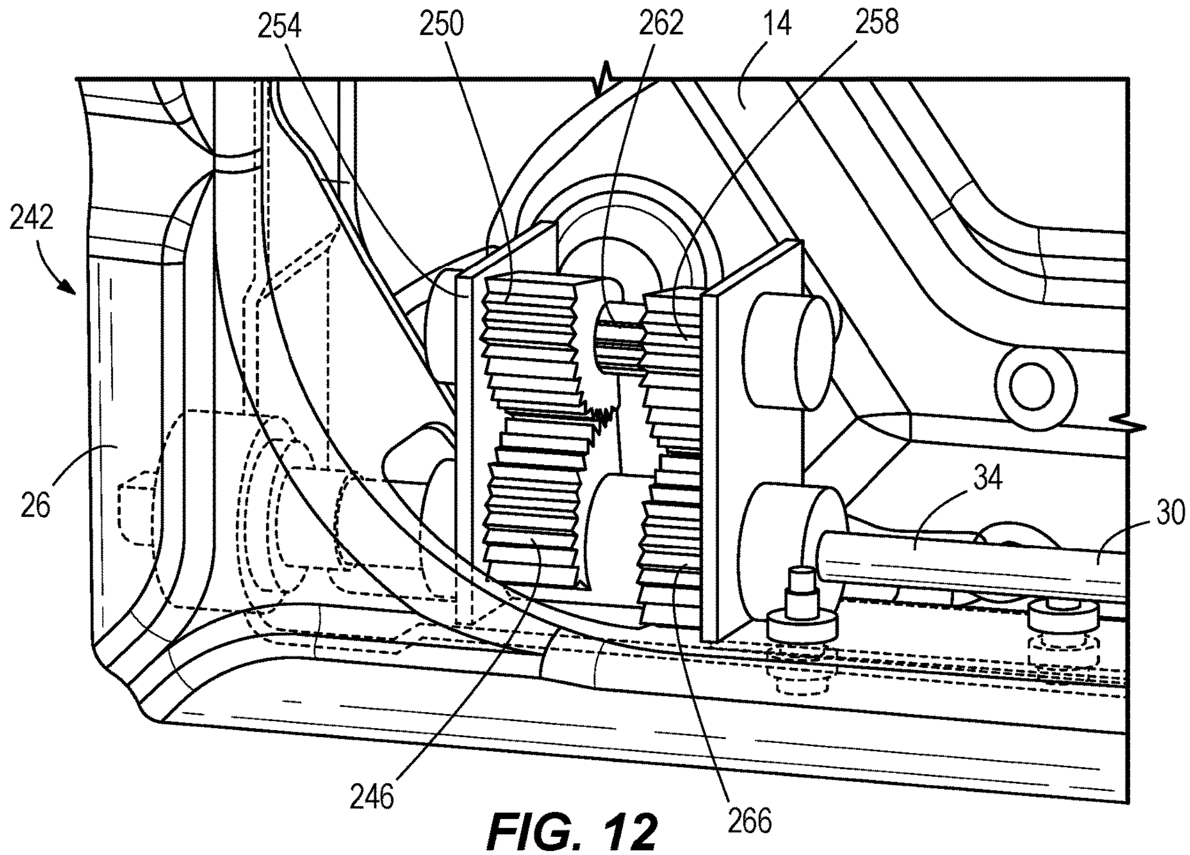
FIG. 12 is a perspective view of a torque device according to another embodiment.
Figure 13:
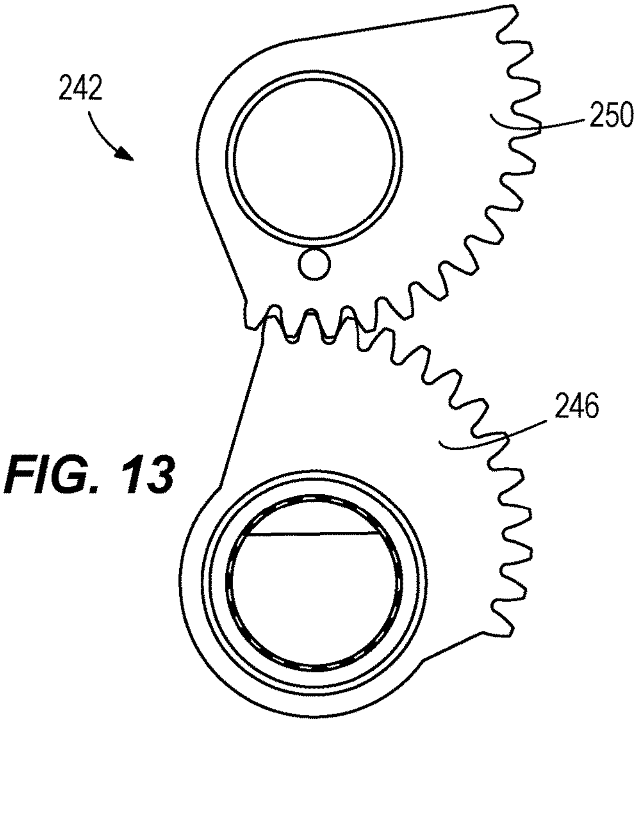
FIG. 13 is a side view of an eccentric driving gear and an eccentric moving gear of the torque device of FIG. 12.

With reference to FIGS. 12-16, in some embodiments the torque device (referenced as 242 in FIG. 12) is disposed for example near the first end 34 of the torsion bar 30. The torque device 242 includes an eccentric driving gear 246 (e.g., fixed to the vehicle frame 26), and an eccentric moving gear 250 that is driven by the eccentric driving gear 246. The eccentric driving gear 246 remains fixed, and stationary. The eccentric moving gear 250 is coupled to a bracket 254, and the bracket 254 is coupled to the vehicle closure 14 and moves with the vehicle closure 14. The eccentric moving gear 250 rotates with the bracket 254 as the vehicle closure 14 rotates relative to the vehicle frame 26. The eccentric driving gear 246 and the eccentric moving gear 250 have varying pitch diameters that allow the eccentric moving gear 250 to rotate non-linearly with the rotation of the vehicle closure 14. For example, as illustrated in FIG. 13, the pitch diameter of the eccentric driving gear 246 may be larger than the pitch diameter of the eccentric moving gear 250.

With continued reference to FIG. 12, the eccentric moving gear 250 is coupled to a first transfer gear 258 along a shaft 262 that is coupled to the bracket 254. The eccentric moving gear 250 and the first transfer gear 258 are each fixed to the shaft 262. The first transfer gear 258 is coupled to and drives a second transfer gear 266. The second transfer gear 266 is coupled (e.g., fixed) to the torsion bar 30. The second transfer gear 266 is coaxial with the eccentric driving gear 246, but moves independently of the eccentric driving gear 246.

Rotation of the vehicle closure 14 relative to the vehicle frame 26 causes the eccentric driving gear 246 to rotate the eccentric moving gear 250, which causes the first transfer gear 258 to rotate the second transfer gear 266, thereby twisting the torsion bar 30 and generating a non-linear torque output. The first transfer gear 258 rotates the second transfer gear 266 in an opposite direction of the rotation of the vehicle closure 14. The resulting rotation of the torsion bar 30 is thus different than the actual rotation of the vehicle closure 14.

Figure 14A:
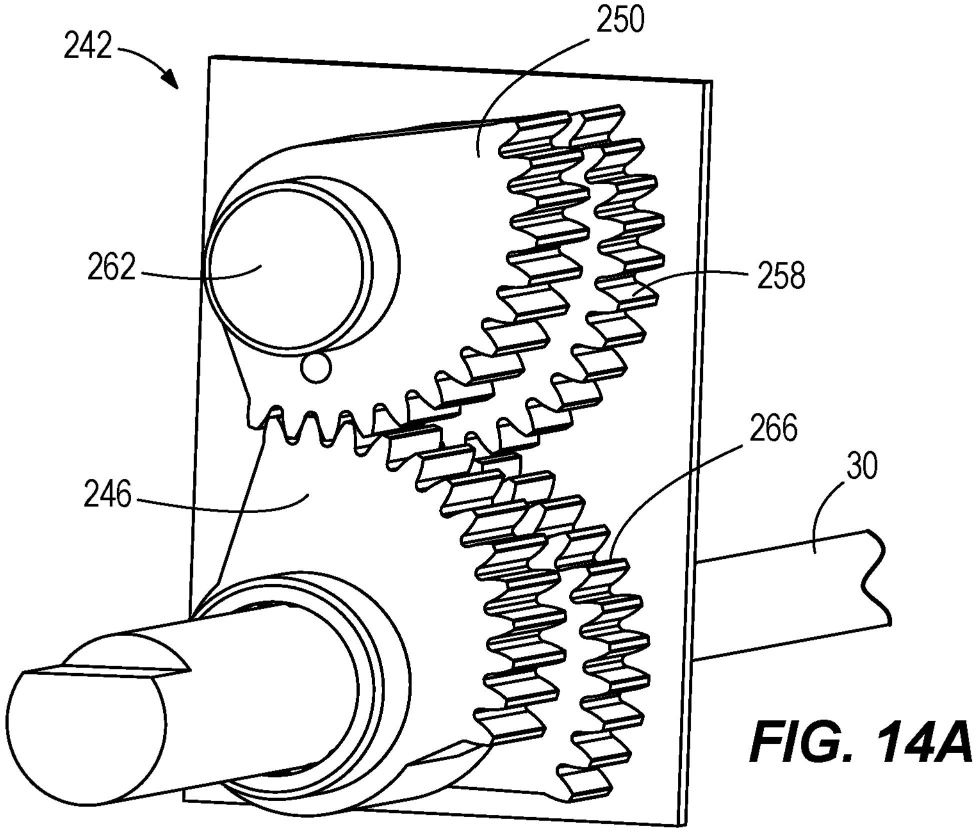
FIGS. 14*a*-14*b* are perspective views of the torque device of FIG. 12, when the vehicle closure is closed, the torque device is rotated 0 degrees, and the torsion bar is rotated 0 degrees.
Figure 14B:
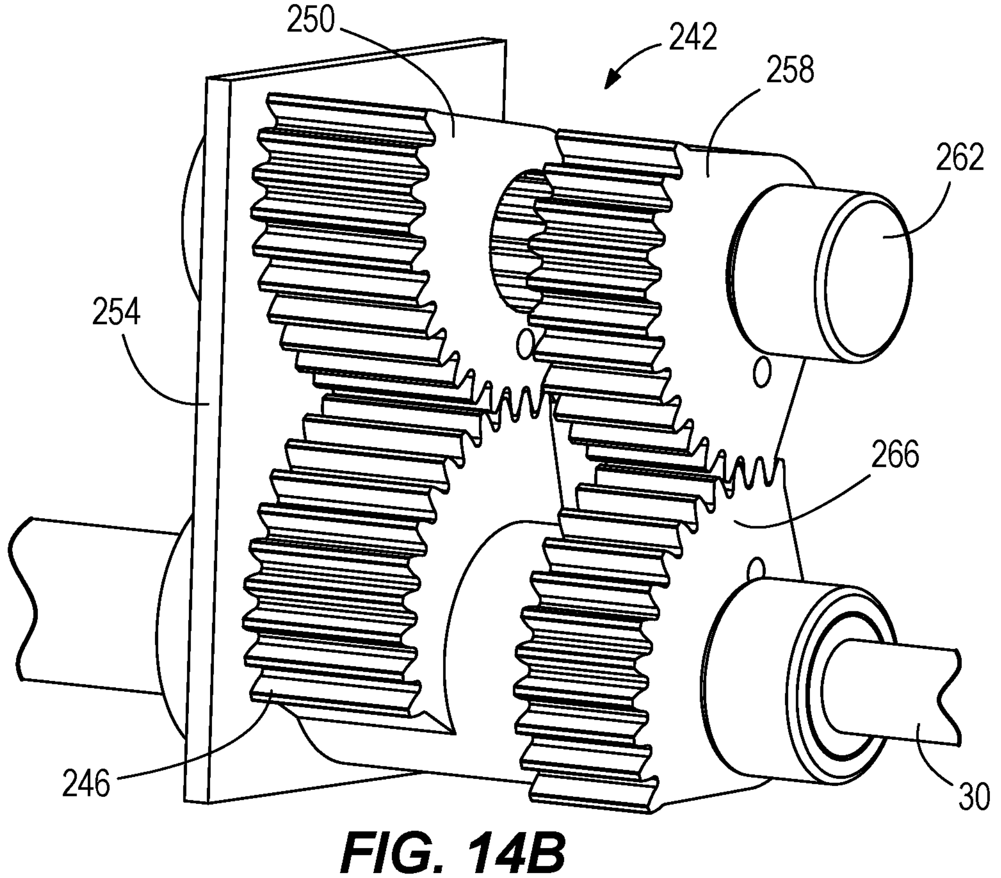

With reference to FIGS. 14*a* and 14*b*, during use the vehicle closure 14 may initially be in the closed position. In this position, the torque device 242 is rotated 0 degrees, and the torsion bar 30 is rotated 0 degrees.

Figure 15A:
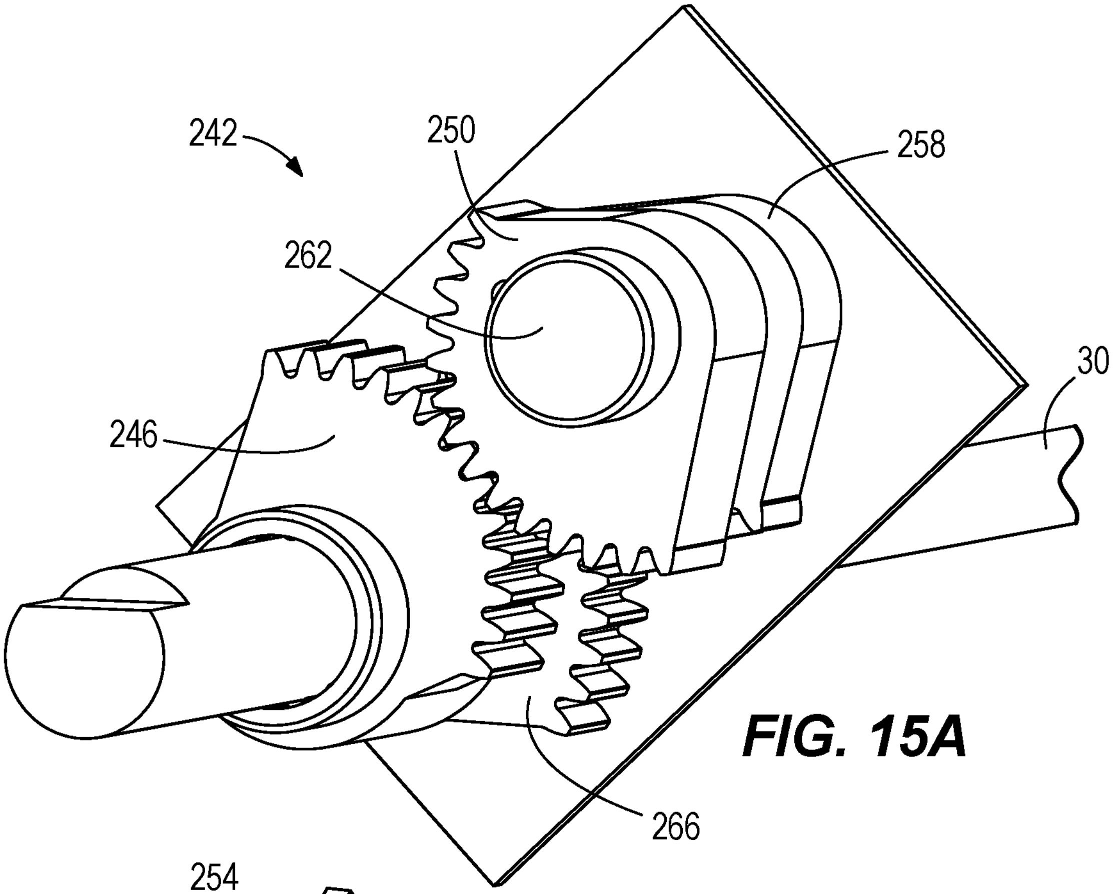
FIGS. 15*a*-15*b* are perspective views of the torque device of FIG. 12, when the vehicle closure is rotated 45 degrees, the torque device is rotated 45 degrees, and the torsion bar is rotated 55 degrees.
Figure 15B:
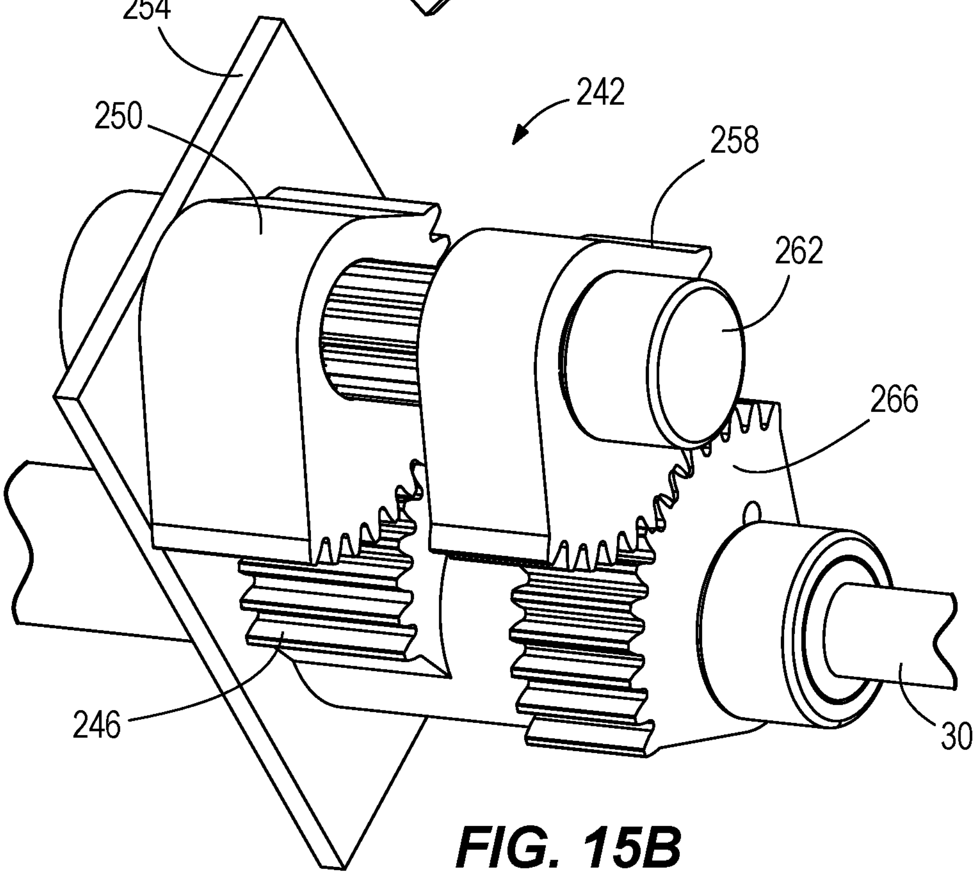

With reference to FIGS. 15*a* and 15*b*, the vehicle closure 14 may be rotated 45 degrees about the pivot axis 18 (e.g., either manually or with the assistance of the power actuator 22), such that the torque device 242 also rotates 45 degrees. As illustrated in FIGS. 15*a* and 15*b*, however, in this position the torsion bar 30 has rotated 55 degrees. This is due to the differing pitch diameters of the eccentric driving gear 246 and the eccentric moving gear 250. In the illustrated embodiment, the eccentric moving gear 250 has a smaller pitch diameter, and will move faster than the rotation of the vehicle closure 14.

Figure 16A:
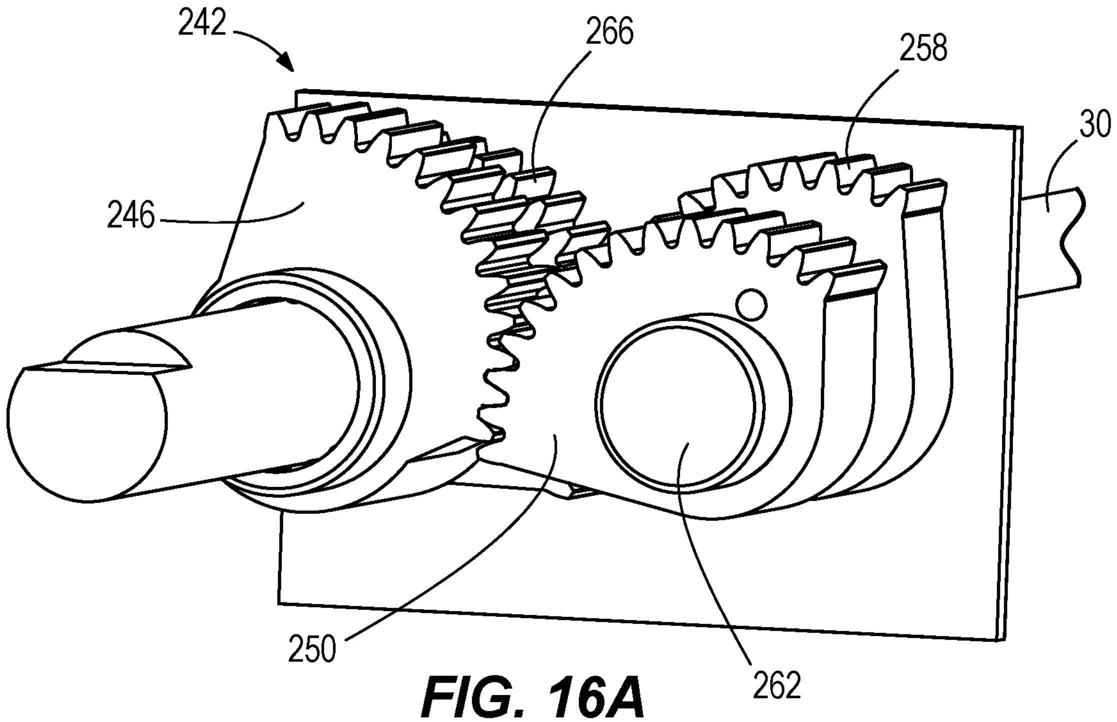
FIGS. 16*a*-16*b* are perspective views of the torque device of FIG. 12, when the vehicle closure is rotated 90 degrees, the torque device is rotated 90 degrees, and the torsion bar is rotated 110 degrees
Figure 16B:
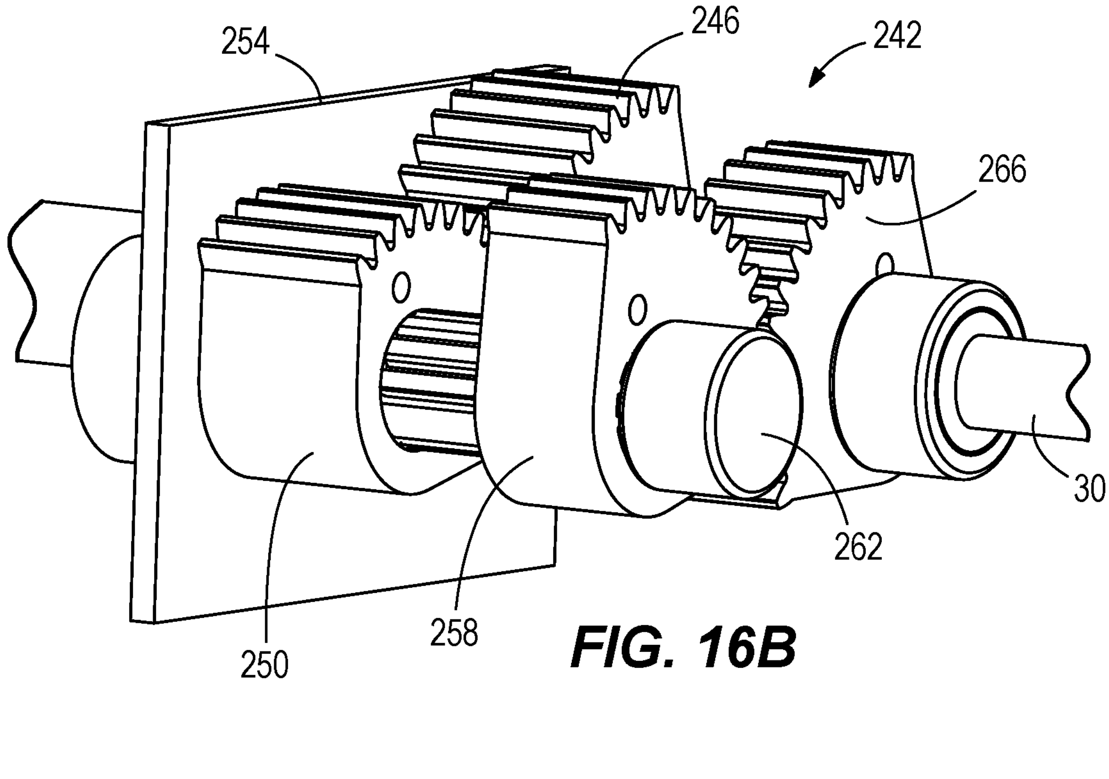
Figure 17A:
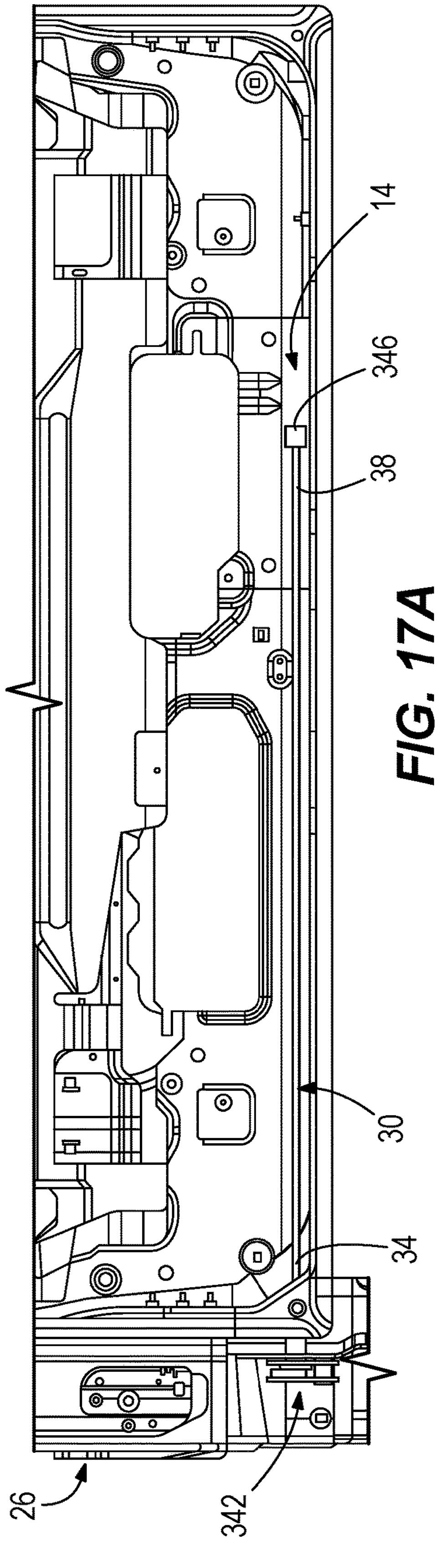
FIGS. 17*a*-19*c* are front and perspective views of a torque device according to another embodiment.
Figure 17B:
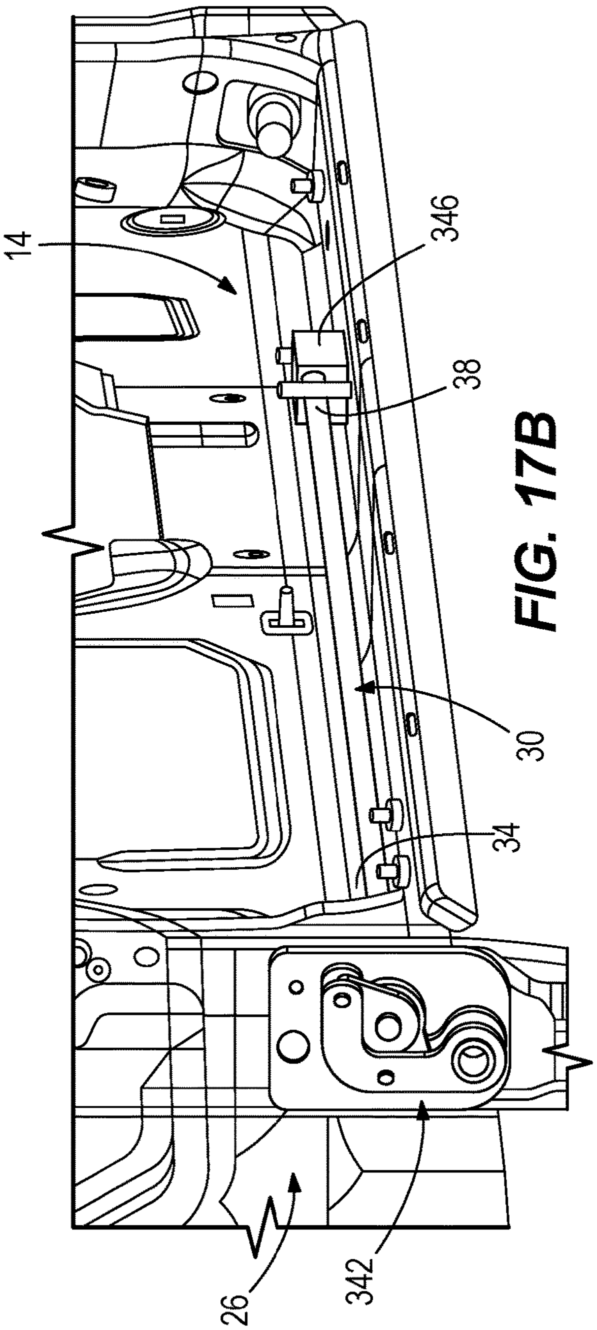

With reference to FIGS. 16*a* and 16*b*, the vehicle closure 14 may be rotated farther another 45 degrees, such that the vehicle closure 14 is in the opened position. As illustrated in FIGS. 16*a* and 16*b*, in this position the vehicle closure 14 has rotated 90 degrees, and the torque device 242 has also rotated 90 degrees. However, in this position the torsion bar 30 has rotated 110 degrees. Again, this is due to the differing pitch diameters of the eccentric driving gear 246 and the eccentric moving gear 250.

With reference to FIGS. 17*a*-19*c*, in some embodiments the torque device (referenced as 342) operates in a vehicle that does not include the power actuator 22. For example, in the illustrated embodiment, the torque device 342 is coupled (e.g., fixed) to the vehicle frame 26. The first end 34 of the torsion bar 30 is coupled to the torque device 342, and the second end 38 of the torsion bar 30 is coupled (e.g., fixed) to a clamp 346 (FIGS. 17*a* and 17*b*) that is itself coupled (e.g., fixed) to the vehicle closure 14. During use, the second end 38 of the torsion bar 30 rotates with the vehicle closure 14, and the first end 34 of the torsion bar 30 rotates in an opposite direction as that of the vehicle closure 14. A net rotation of the torsion bar 30 is equivalent to the rotation of the vehicle closure 14 at the second end 38 of the torsion bar 30, in combination with the reverse rotation at the first end 34 of the torsion bar 30, resulting in a non-linear torque output.

Figure 18:
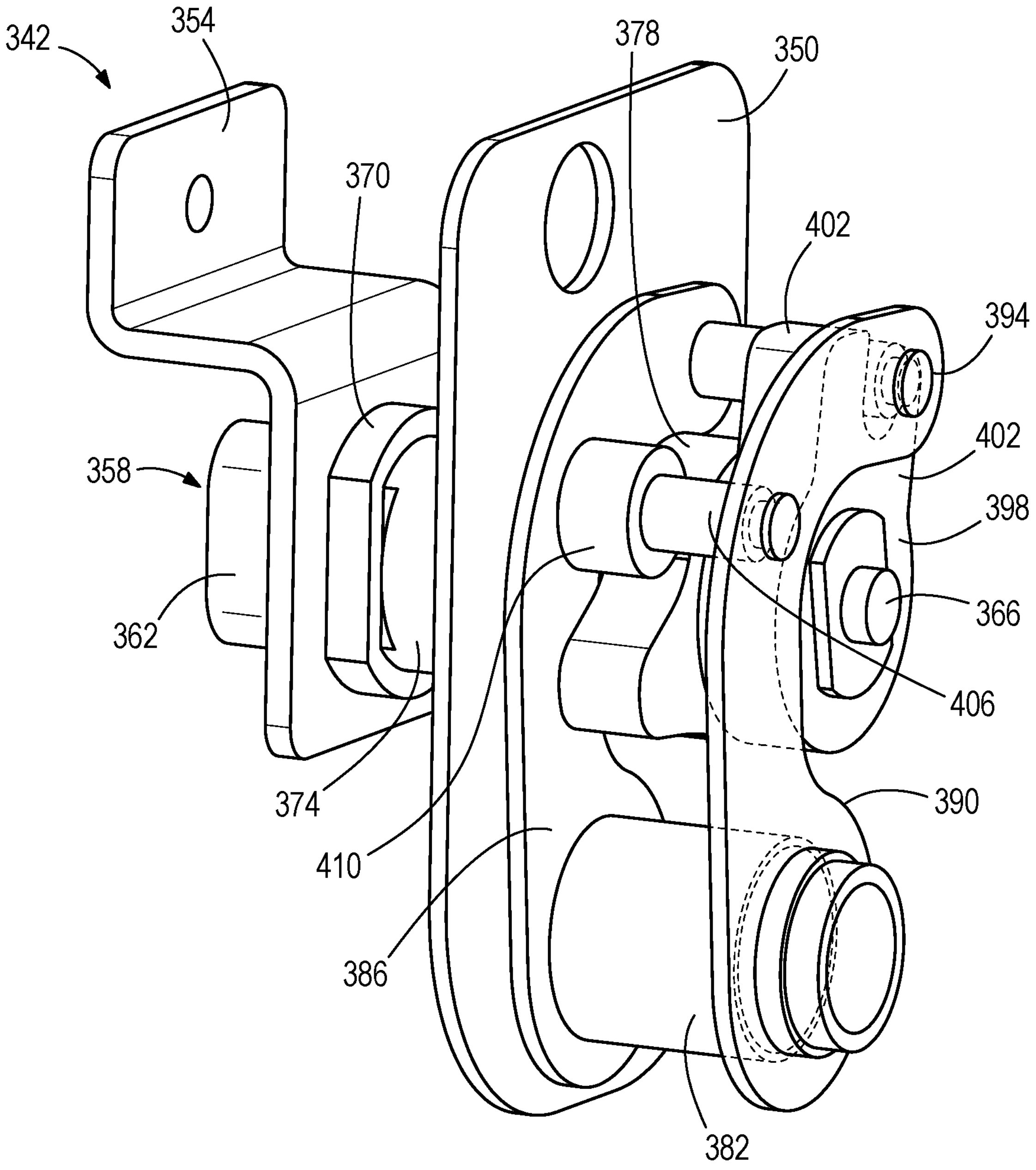
Figure 19A:
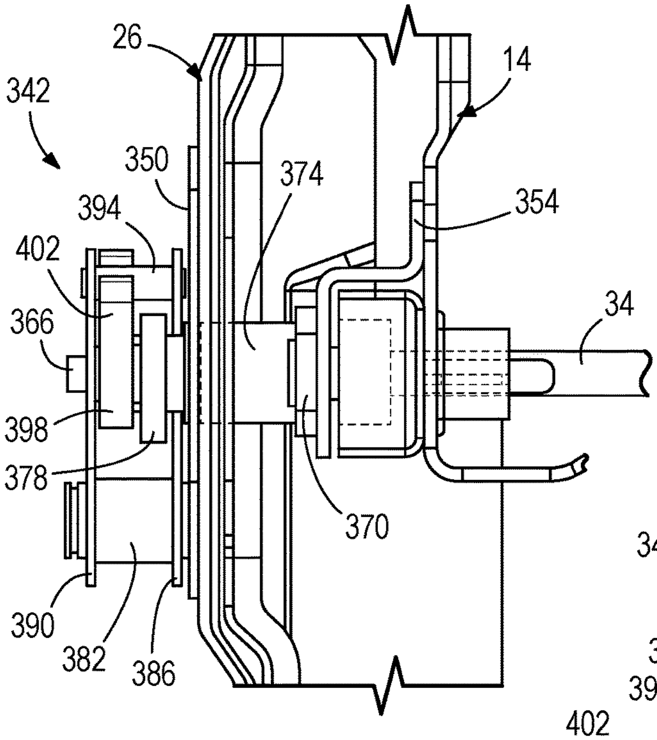
Figure 19B:
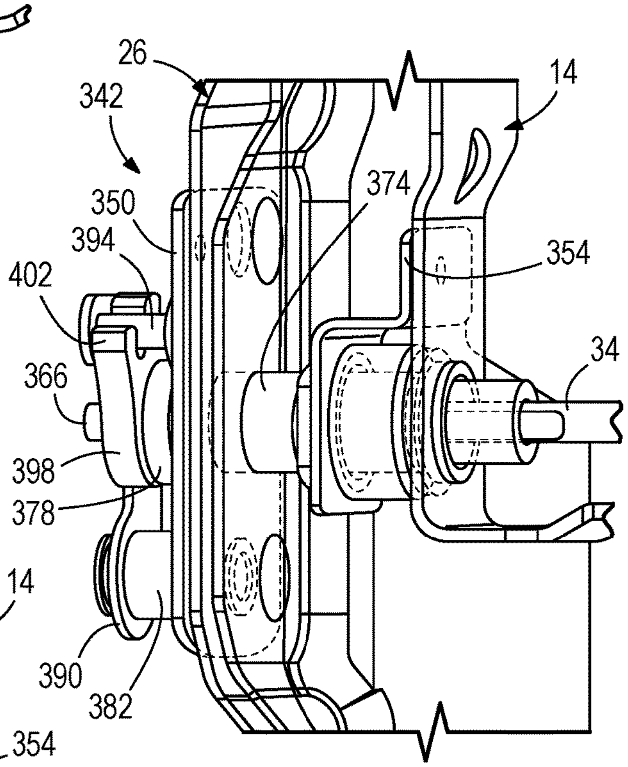
Figure 19C:
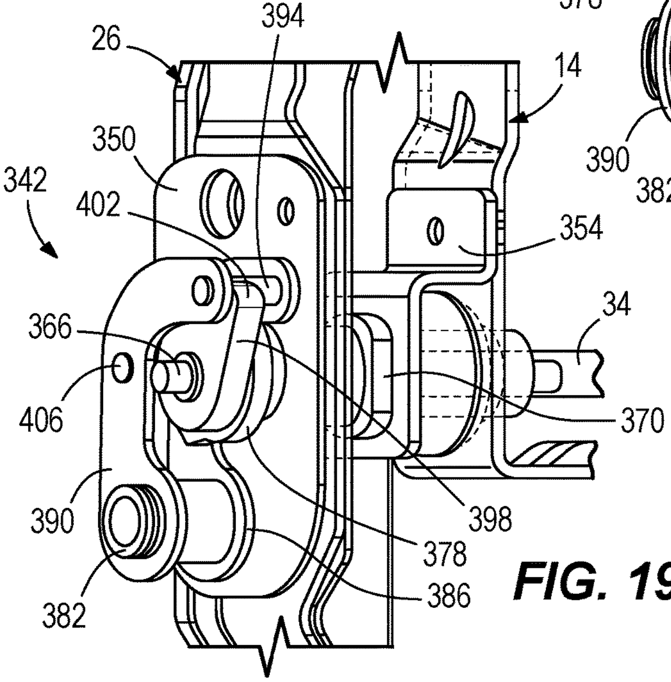

With reference to FIGS. 18-19*c*, in the illustrated embodiment the torque device 342 includes a first, base bracket 350 (e.g., plate) that is coupled (e.g., fixed) to the vehicle frame 26. The torque device 342 additionally includes a second bracket 354 that is coupled (e.g., fixed) to the vehicle closure 14. A shaft 358 extends through both the first bracket 350 and the second bracket 354. The shaft 358 includes a first, enlarged, non-cylindrical head 362 that is coupled (e.g., rotationally coupled) to the first end 34 of the torsion bar 30, and a second, opposite end 366 that protrudes outwardly from the first bracket 350 and away from the vehicle frame 26. A bushing 370 extends through the second bracket 354, and a sleeve 374 extends through each of the bushing 370, the first bracket 350, and the second bracket 354. The shaft 358 extends through the sleeve 374. The shaft 358 is concentric to the sleeve 374, but during operation rotates in an opposite direction from the sleeve 374.

With continued reference to FIGS. 18-19*c*, the torque device 342 additionally includes a cam 378 coupled (e.g., fixed) to one end of the sleeve 374. In the illustrated embodiment, the second bracket 354, the bushing 370, the sleeve 374, and the cam 378 are all coupled to one another (e.g., fixed rigidly to one another) such that they rotate together with rotation of the vehicle closure 14. In other embodiments, two or more of the second bracket 354, the bushing 370, the sleeve 374, and the cam 378 may be integrally formed together as a single piece.

The torque device 342 additionally includes a first rivet 382 that is coupled to (e.g., fixed to) the first bracket 350 and extends (e.g., perpendicularly) from the first bracket 350. A first lever 386 is coupled (e.g., pivotally coupled) to the first rivet 382, and a second lever 390 is coupled (e.g., pivotally coupled) to the first rivet 382. In the illustrated embodiment, the first lever 386 extends parallel to the second lever 390. Each of the first lever 386 and the second lever 390 has a generally C-shaped curved outer profile, although other embodiments include different shapes.

With continued reference to FIGS. 18-19*c*, the torque device 342 additionally includes a second rivet 394 that extends between and is coupled to (e.g., fixed to) both the first lever 386 and the second lever 390, and a third lever 398 that is coupled to (e.g., fixed to) the second end 366 of the shaft 358 and rotates with the shaft 358. The third lever 398 includes at least one arm 402 that extends over and/or around the second rivet 394, such that movement of the second rivet 394 may drive rotation of the third lever 398.

With continued reference to FIGS. 18-19*c*, the torque device 342 additionally includes a third rivet 406 that extends between and is coupled to (e.g., fixed to) both the first lever 386 and the second lever 390. A roller wheel 410 is coupled to and extend around the third rivet 406.

During use, and when the vehicle closure 14 is rotated (e.g., pivoted up or down), the second bracket 354, the bushing 370, the sleeve 374, and the cam 378 all rotate together with the vehicle closure 14. The roller wheel 410 contacts an outer surface of the cam 378. Rotation of the cam 378 therefore deflects the roller wheel 410, forcing the first and second levers 386, 390 to pivot about the first rivet 382. The pivoting motion of the first and second levers 386, 390 about the first rivet 382 forces the second rivet 394 to engage an arm 402 of the third lever 398, forcing a rotation of the third lever 398 and a rotation of the second end 366 of the shaft 358. This rotation of the shaft 358 causes a rotation of the first end 34 of the torsion bar 30. The shaft 358 (and first end 34 of the torsion bar 30) may thereby rotate in an opposite direction as that of the vehicle closure 14.

Figure 20:
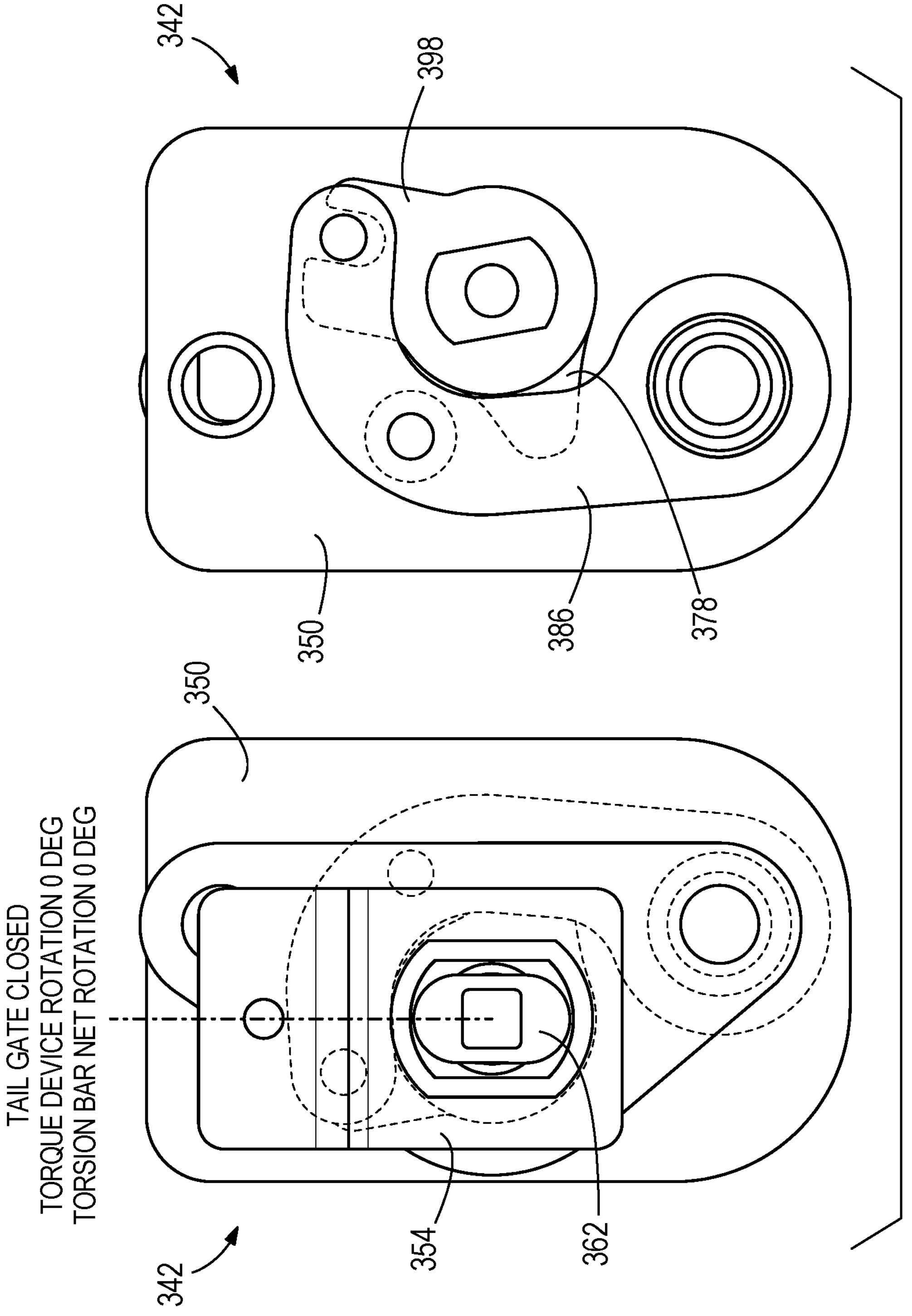
Figures 21A, 21B, 21C, 21D, 21E, 21F:
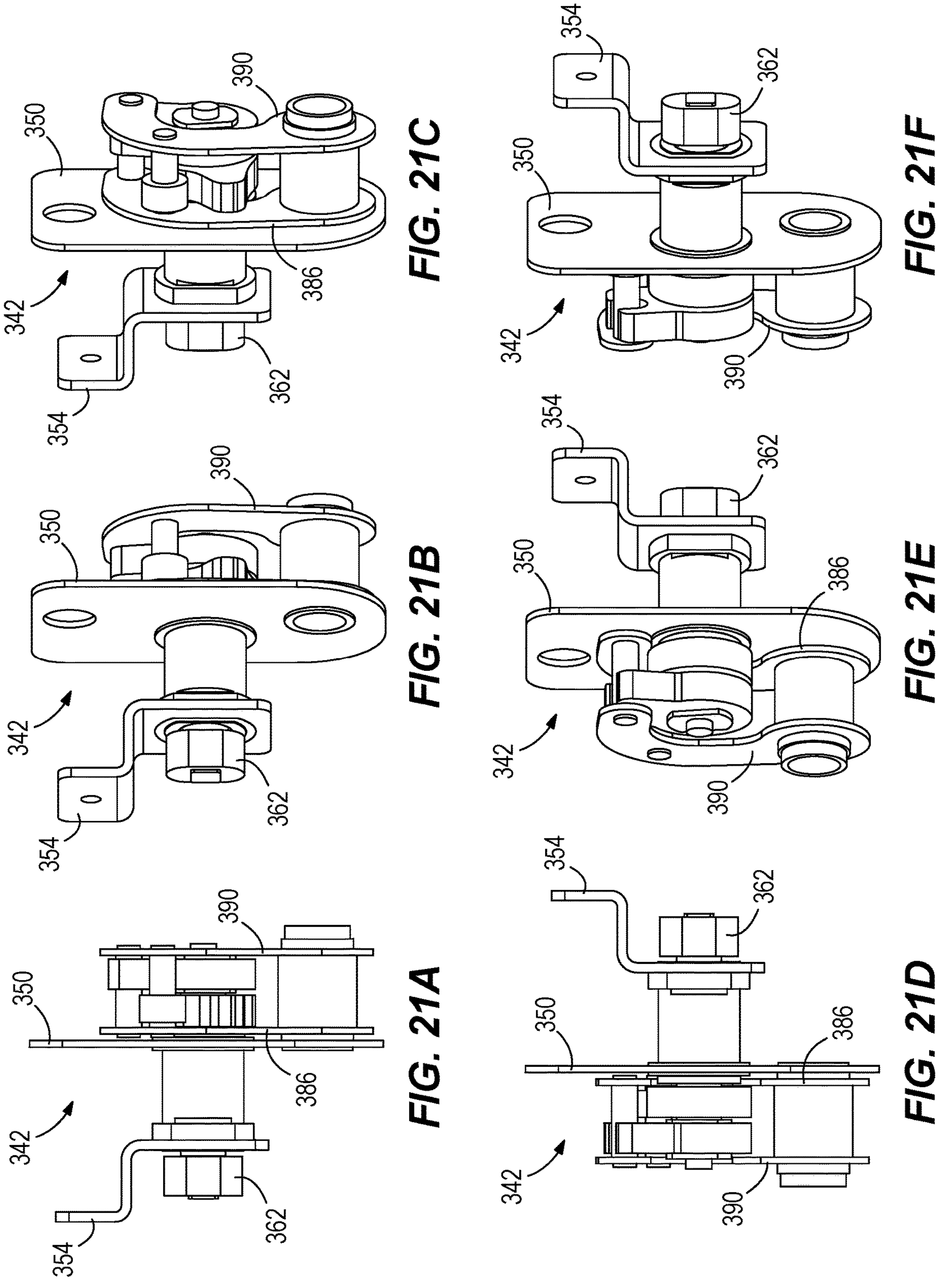

FIGS. 20-25*f* further illustrate use of the torque device 342. With reference to FIGS. 20-21*f*, the vehicle closure 14 may initially be in the closed position. In this position, the torque device 342 is rotated 0 degrees, and the torsion bar 30 is rotated 0 degrees.

Figure 22:
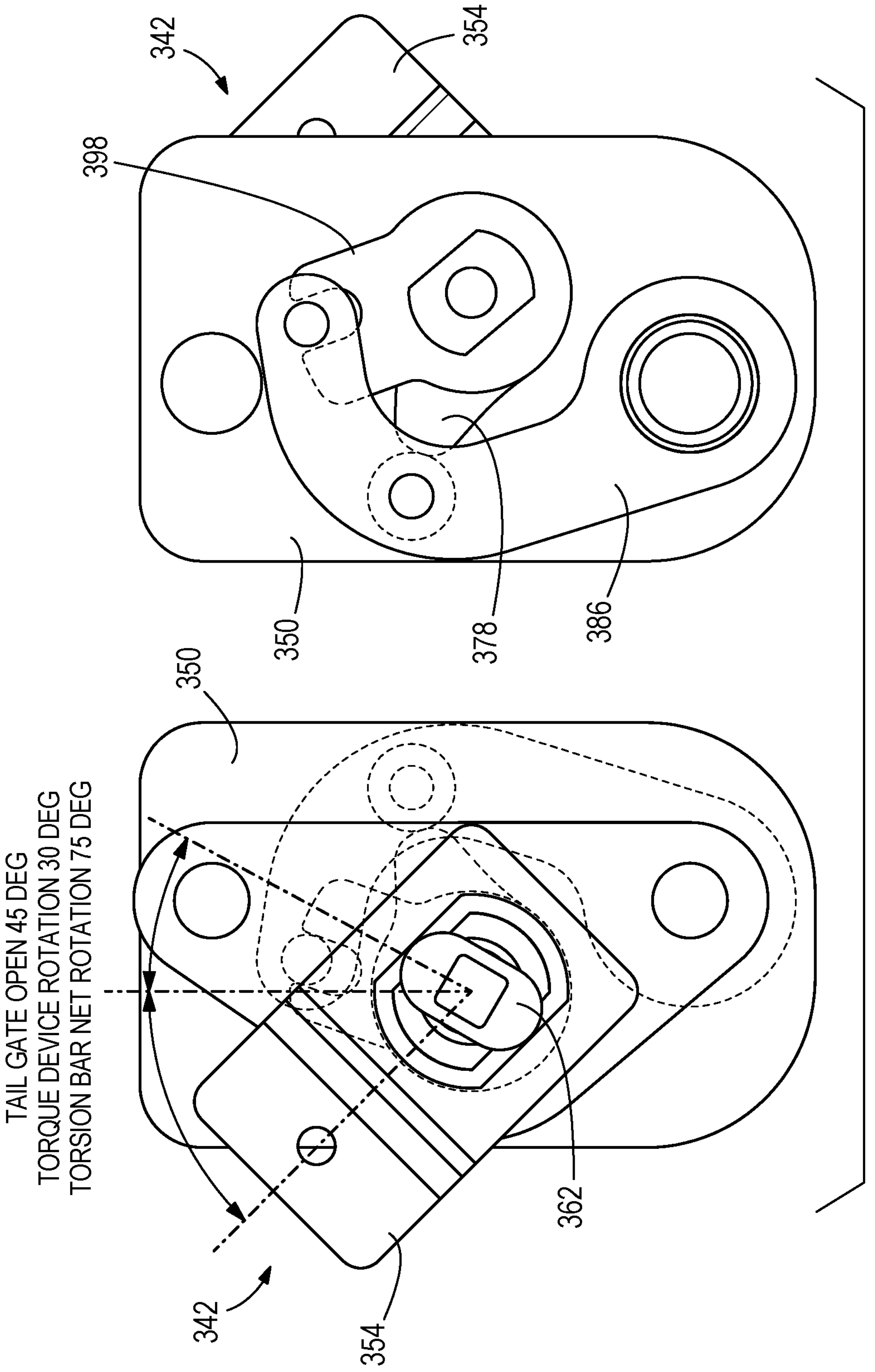
FIGS. 22-23*f* are side, front, and perspective views of the torque device of FIGS. 17-19*c*, when the vehicle closure is rotated 45 degrees, the torque device is rotated 30 degrees, and the torsion bar is rotated 75 degrees.
Figure 23A:
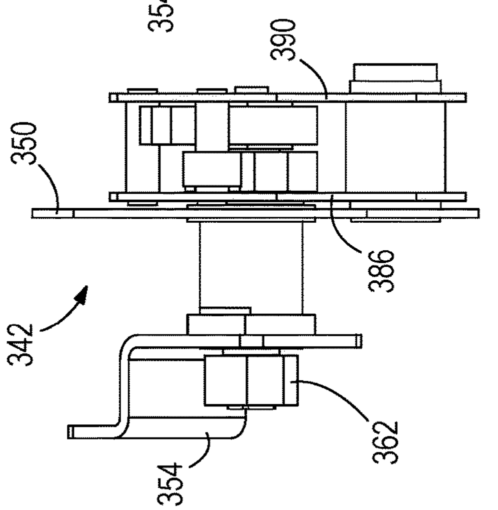
Figure 23B:
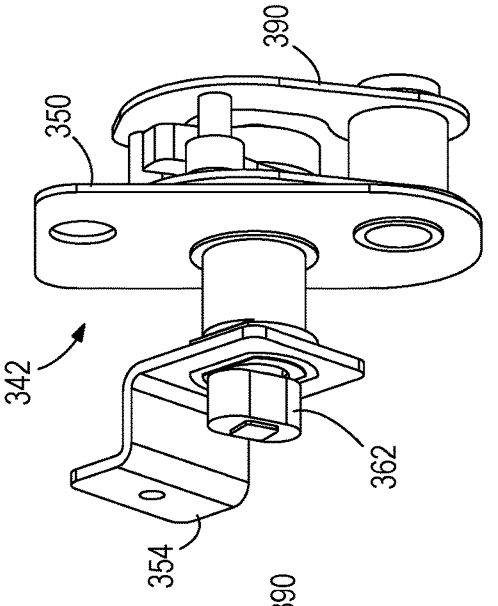
Figure 23C:
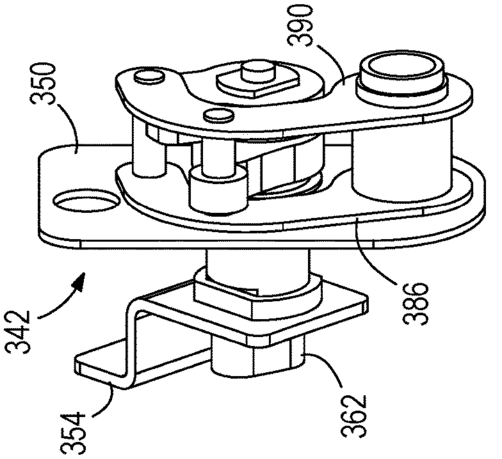
Figure 23D:
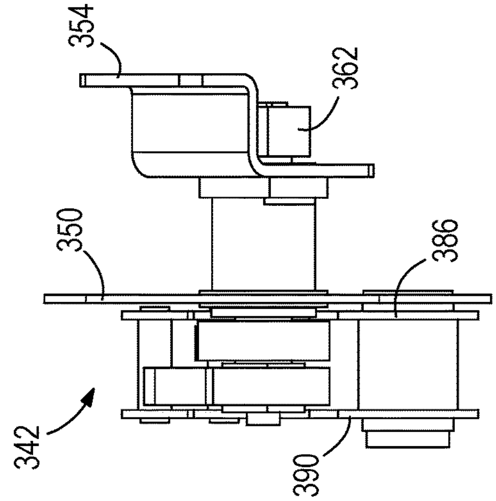
Figure 23E:
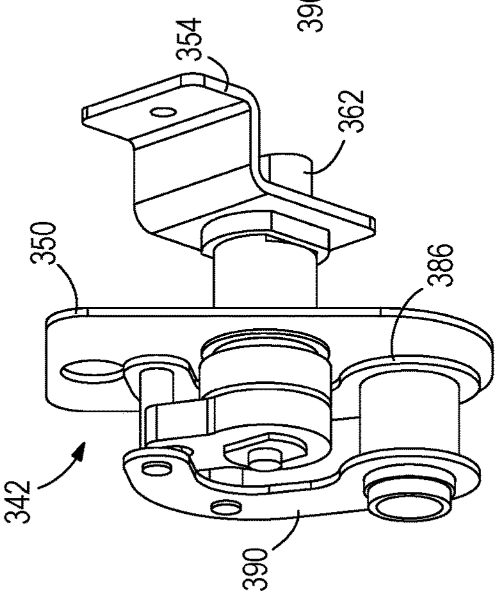
Figure 23F:
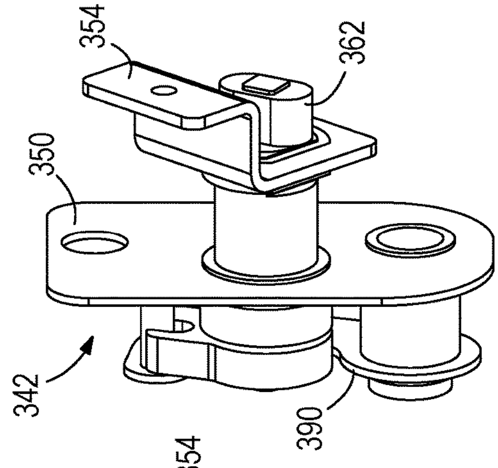

With reference to FIGS. 22-23*f*, the vehicle closure 14 and its attached second bracket 354 and the second end 38 of the torsion bar 30 may be rotated (e.g., manually) 45 degrees about the pivot axis 18 (counterclockwise as illustrated in FIG. 22). This generates pivoting movement of the first and second levers 386, 390, and a reverse rotation of the torsion bar 30 of 30 degrees (clockwise as illustrated in FIG. 22), resulting in an overall net rotation of the torsion bar 30 of 75 degrees.

Figure 24:
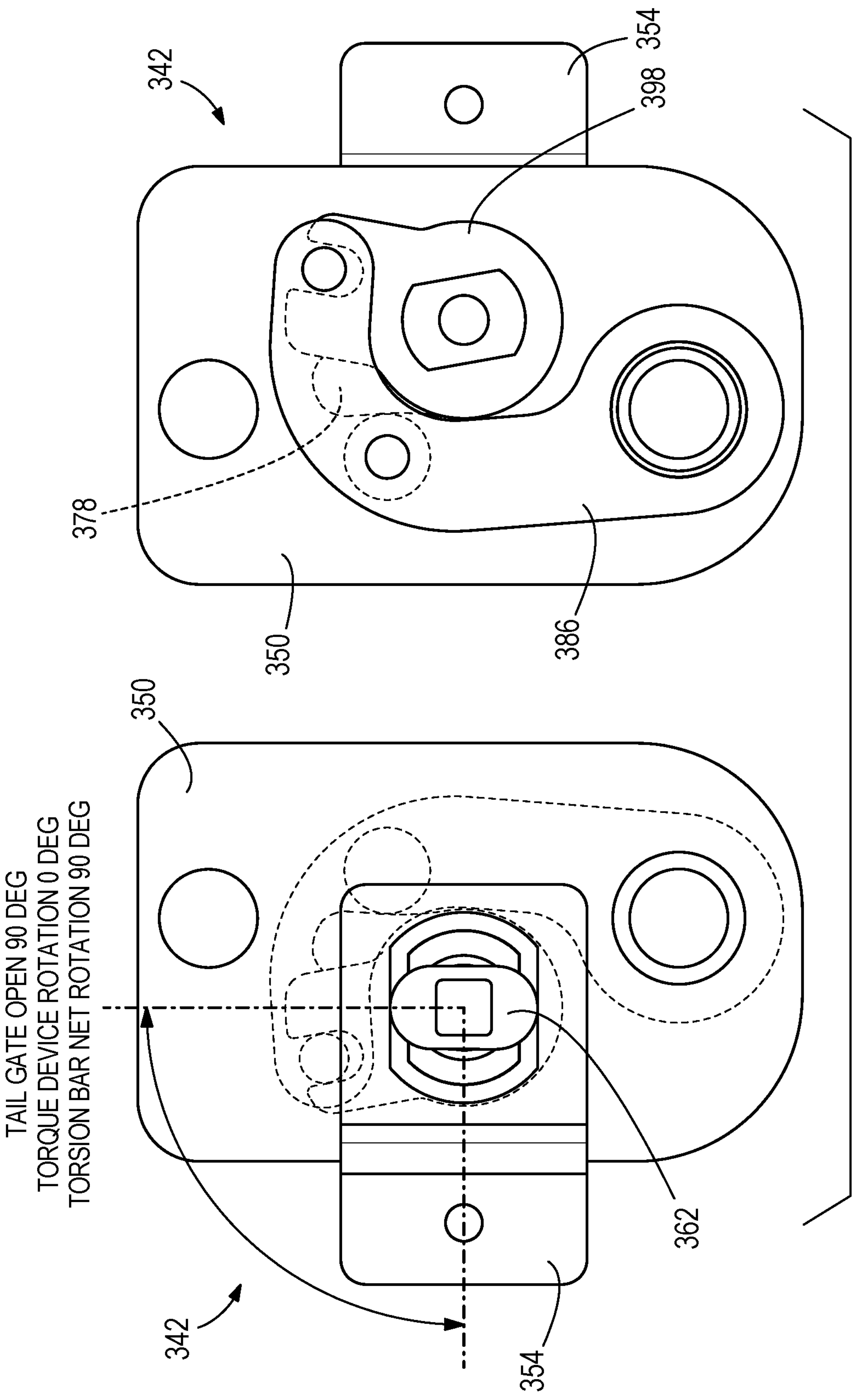
FIGS. 24-25*f* are side, front, and perspective views of the torque device of FIGS. 17-19*c*, when the vehicle closure is rotated 90 degrees, the torque device is rotated 0 degrees, and the torsion bar is rotated 90 degrees.
Figure 25A:
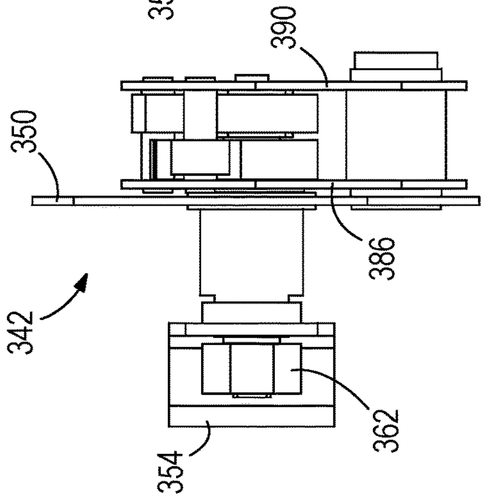
Figure 25B:
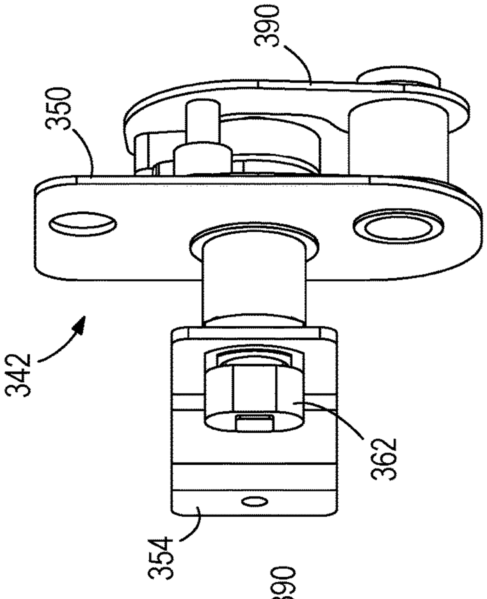
Figure 25C:
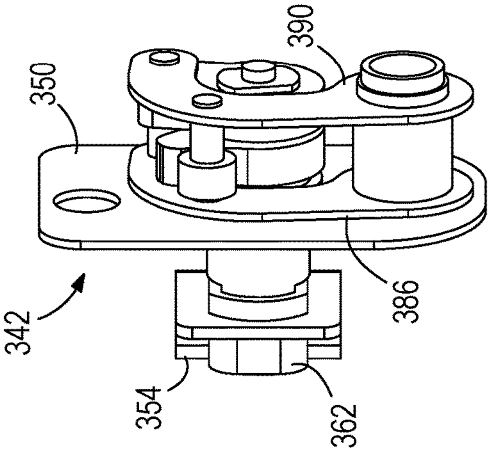
Figure 25D:
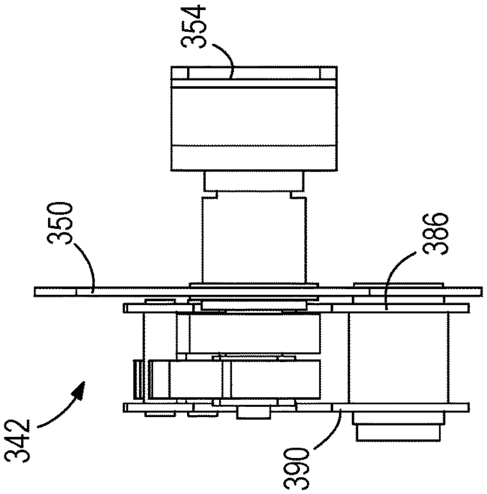
Figure 25E:
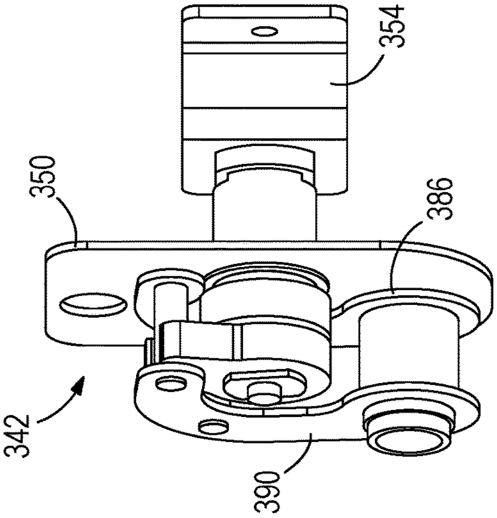
Figure 25F:
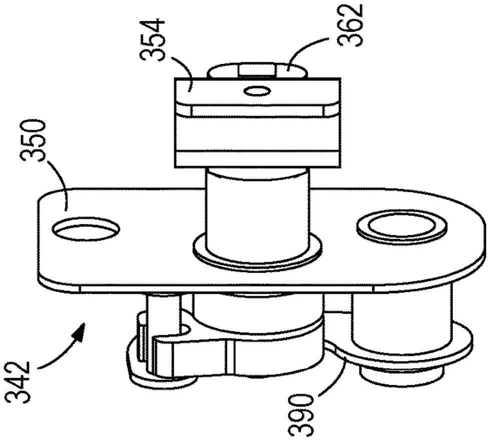

With reference to FIGS. 24-25*f*, the vehicle closure 14 may be rotated farther (counterclockwise as illustrated in FIG. 24) another 45 degrees (i.e., to a 90 degree angle), such that the vehicle closure 14 is in the opened position and the second end 38 of the torsion bar 30 has rotated 90 degrees. As the cam 378 rotates with the vehicle closure 14, the roller wheel 410 allows the first and second levers 386, 390 and the shaft 358 and the first end 34 of the torsion bar 30 to pivot back to their original positions, and an overall net rotation of the torsion bar 30 is 90 degrees.

Although the disclosure has been described in detail referring to certain preferred embodiments, variations and modifications exist within the scope and spirit of one or more independent aspects of the disclosure as described.

What is claimed is:

1. A vehicle closure system comprising:

a vehicle frame;

a vehicle closure pivotally coupled to the vehicle frame;

a torsion bar fixed to both the vehicle frame and the vehicle closure; and a torque device coupled to the torsion bar, wherein the torque device is configured to generate a non-linear torsion bar torque output as the vehicle closure pivots relative to the vehicle frame.

2. The vehicle closure system of claim 1, wherein the torque device and the torsion bar are arranged such that when the vehicle closure is fully raised in a closed position relative to the vehicle frame and a torsion bar angle is zero degrees, the torque device is configured to generate a non-zero torque output, and wherein when the torsion bar is rotated toward a fully opened position relative to the vehicle frame, the torque output is configured to increase non-linearly.

3. The vehicle closure system of claim 1, further comprising a power actuator coupled to the vehicle closure, wherein the power actuator is configured to drive rotation of the vehicle closure about an axis relative to the vehicle frame.

4. The vehicle closure system of claim 1, wherein the torque device includes a base bracket coupled to the vehicle closure, such that the base bracket is configured to move with the vehicle closure.

5. The vehicle closure system of claim 4, wherein the torque device further includes a first rivet coupled to the base bracket, a first lever pivotally coupled to the first rivet, a second rivet coupled to the first lever, a link member pivotally coupled to the second rivet, and a second lever pivotally coupled to the link member.

6. The vehicle closure system of claim 5, wherein the second lever is fixed to the torsion bar, such that rotation of the second lever is configured to cause a twisting of the torsion bar.

7. The vehicle closure system of claim 6, wherein the torque device further includes a shaft fixed to the vehicle frame, wherein the shaft is coaxial with the torsion bar but is configured to move independently from the torsion bar, wherein the torque device includes a cam member coupled to an end of the shaft.

8. The vehicle closure system of claim 7, wherein the torque device includes a roller coupled to the first lever, wherein the roller is sized, shaped, and positioned such that it is configured to contact and roll along an outer surface of the cam member, forcing the first lever to move non-linearly as the base bracket rotates with the vehicle closure.

9. The vehicle closure system of claim 1, wherein the torque device includes an eccentric driving gear, and an eccentric moving gear fixed to the torsion bar and configured to be driven by the eccentric driving gear.

10. The vehicle closure system of claim 9, wherein the torque device includes a link member coupled to the eccentric driving gear, and a shaft coupled to the link member, wherein the shaft is fixed to the vehicle frame, wherein rotation of the vehicle closure relative to the vehicle frame is configured to cause the link member to rotate the eccentric driving gear, causing the eccentric driving gear to drive rotation of the eccentric moving gear and twist the torsion bar.

11. The vehicle closure system of claim 1, wherein the torque device includes an eccentric driving gear fixed to the vehicle frame and an eccentric moving gear configured to be driven by the eccentric driving gear, wherein the torque device also includes a bracket coupled to both the eccentric moving gear and to the vehicle closure.

12. The vehicle closure system of claim 11, wherein the eccentric moving gear is configured to rotate with the bracket as the vehicle closure rotates relative to the vehicle frame, wherein the eccentric driving gear and the eccentric moving gear have varying pitch diameters that allow the eccentric moving gear to rotate non-linearly with the rotation of the vehicle closure.

13. The vehicle closure system of claim 12, wherein a pitch diameter of the eccentric driving gear is larger than a pitch diameter of the eccentric moving gear.

14. The vehicle closure system of claim 12, wherein the torque device includes a first transfer gear coupled to the eccentric moving gear along a shaft that is coupled to the bracket, wherein the eccentric moving gear and the first transfer gear are each fixed to the shaft, wherein the torque device also includes a second transfer gear, wherein the first transfer gear is coupled to and configured to drive the second transfer gear, and wherein the second transfer gear is fixed to the torsion bar.

15. The vehicle closure system of claim 1, wherein the torsion bar includes a first end and a second, opposite end, wherein the first end of the torsion bar is coupled to the torque device, and the second end of the torsion bar is fixed to a clamp, wherein the clamp is fixed to the vehicle closure, wherein the second end of the torsion bar is configured to rotate with the vehicle closure, and the first end of the torsion bar is configured to rotate in an opposite direction as that of the vehicle closure.

16. The vehicle closure system of claim 1, wherein the torsion bar includes a first end and a second, opposite end, wherein the torque device includes a first, base bracket that is fixed to the vehicle frame, and a second bracket that is fixed to the vehicle closure, wherein the torque device further includes a shaft that extends through both the first bracket and the second bracket, wherein the shaft includes a first, non-cylindrical head that is rotationally coupled to the first end of the torsion bar.

17. The vehicle closure system of claim 16, wherein the torque device further includes a bushing that extends through the second bracket, and a sleeve that extends through each of the bushing, the first bracket, and the second bracket, wherein the shaft extends through the sleeve, wherein the torque device further includes a cam fixed to the sleeve, wherein the shaft is concentric to the sleeve, but is configured to rotate in an opposite direction from the sleeve.

18. The vehicle closure system of claim 17, wherein the torque device further includes a first rivet fixed to the first bracket, a first lever pivotally coupled to the first rivet, a second lever pivotally coupled to the first rivet, a second rivet fixed to both the first lever and the second lever, a third lever fixed to the shaft and having an arm that extends over the second rivet, a third rivet that extends between and is fixed to both the first lever and the second lever, and a roller wheel coupled to the third rivet.

* * * * *